(12) United States Patent
Horiguchi

(10) Patent No.: US 7,522,668 B2
(45) Date of Patent: Apr. 21, 2009

(54) RADIO COMMUNICATION SYSTEM AND RADIO TRANSMITTER

(75) Inventor: Tomoya Horiguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 11/372,199

(22) Filed: Mar. 10, 2006

(65) Prior Publication Data

US 2006/0182185 A1 Aug. 17, 2006

Related U.S. Application Data

(63) Continuation of application No. PCT/JP2005/024159, filed on Dec. 22, 2005.

(30) Foreign Application Priority Data

Dec. 22, 2004 (JP) ............................. 2004-372182

(51) Int. Cl.
    *H04B 1/66* (2006.01)
(52) U.S. Cl. .................. 375/241; 375/130; 375/240
(58) Field of Classification Search ............... 375/241, 375/130, 240
    See application file for complete search history.

(56) References Cited

U.S. PATENT DOCUMENTS

| | | | | |
|---|---|---|---|---|
| 3,638,182 A | * | 1/1972 | Burton et al. | 714/761 |
| RE32,291 E | * | 11/1986 | Nakagome et al. | 382/245 |
| 5,454,009 A | * | 9/1995 | Fruit et al. | 375/130 |
| 5,541,954 A | * | 7/1996 | Emi | 375/133 |

(Continued)

FOREIGN PATENT DOCUMENTS

DE    199 37 706 A1    3/2001

(Continued)

OTHER PUBLICATIONS

Notification of Transmittal of the International Search Report and the Written Opinion of the International Searching authority, or the Declaration, issued by the International Searching Authority mailed May 16, 2006, for International Application No. PCT/JP2005/024159.

(Continued)

*Primary Examiner*—Shuwang Liu
*Assistant Examiner*—Michael R Neff
(74) *Attorney, Agent, or Firm*—Finnegan, Henderson, Farabow, Garrett & Dunner, L.L.P.

(57) ABSTRACT

Radio communication system includes radio transmitter including adding unit adding parity bit for error detection to data, spreading unit spreading, in time-and-frequency direction, data with parity bit, based on spreading pattern, transmission unit transmitting spread data, and reception unit receiving retransmission-request signal, wherein in response to retransmission-request signal, spreading unit spreads to-be-retransmitted data with parity bit, based on varied spreading pattern being varied according to spreading rate in time direction and spreading rate in frequency direction, and transmission unit transmits spread to-be-retransmitted data, and radio receiver including reception unit receiving transmitted spread data, de-spreading unit de-spreading received spread data, based on spreading pattern, error detection unit detecting error of de-spread data, based on parity bit, and transmission unit transmitting retransmission-request signal requesting retransmission of data if error is detected in de-spread data, wherein reception unit receives retransmitted data, and de-spreading unit de-spreads retransmitted data, based on varied spreading pattern.

12 Claims, 19 Drawing Sheets

U.S. PATENT DOCUMENTS

| | | | | |
|---|---|---|---|---|
| 6,009,117 | A | * | 12/1999 | Yamamura .................. 375/141 |
| 6,115,408 | A | * | 9/2000 | Gendel et al. ................ 375/132 |
| 2002/0027897 | A1 | | 3/2002 | Moulsley et al. |
| 2003/0053413 | A1 | | 3/2003 | Sawahashi et al. |

FOREIGN PATENT DOCUMENTS

| | | |
|---|---|---|
| EP | 1 317 087 A1 | 6/2003 |
| JP | 2000-332724 | 11/2000 |
| JP | 2003-224621 | 8/2003 |
| JP | 2004-048716 | 2/2004 |
| JP | 2004-104293 | 4/2004 |
| JP | 2004-104574 | 4/2004 |
| JP | 2004-104775 | 4/2004 |
| JP | 2004-221972 | 8/2004 |
| JP | 2004-297370 | 10/2004 |

OTHER PUBLICATIONS

Notification of Reasons for Rejection mailed Jul. 29, 2008, in Japanese Patent Application 2004-372182 with English translation (5 pages).

* cited by examiner

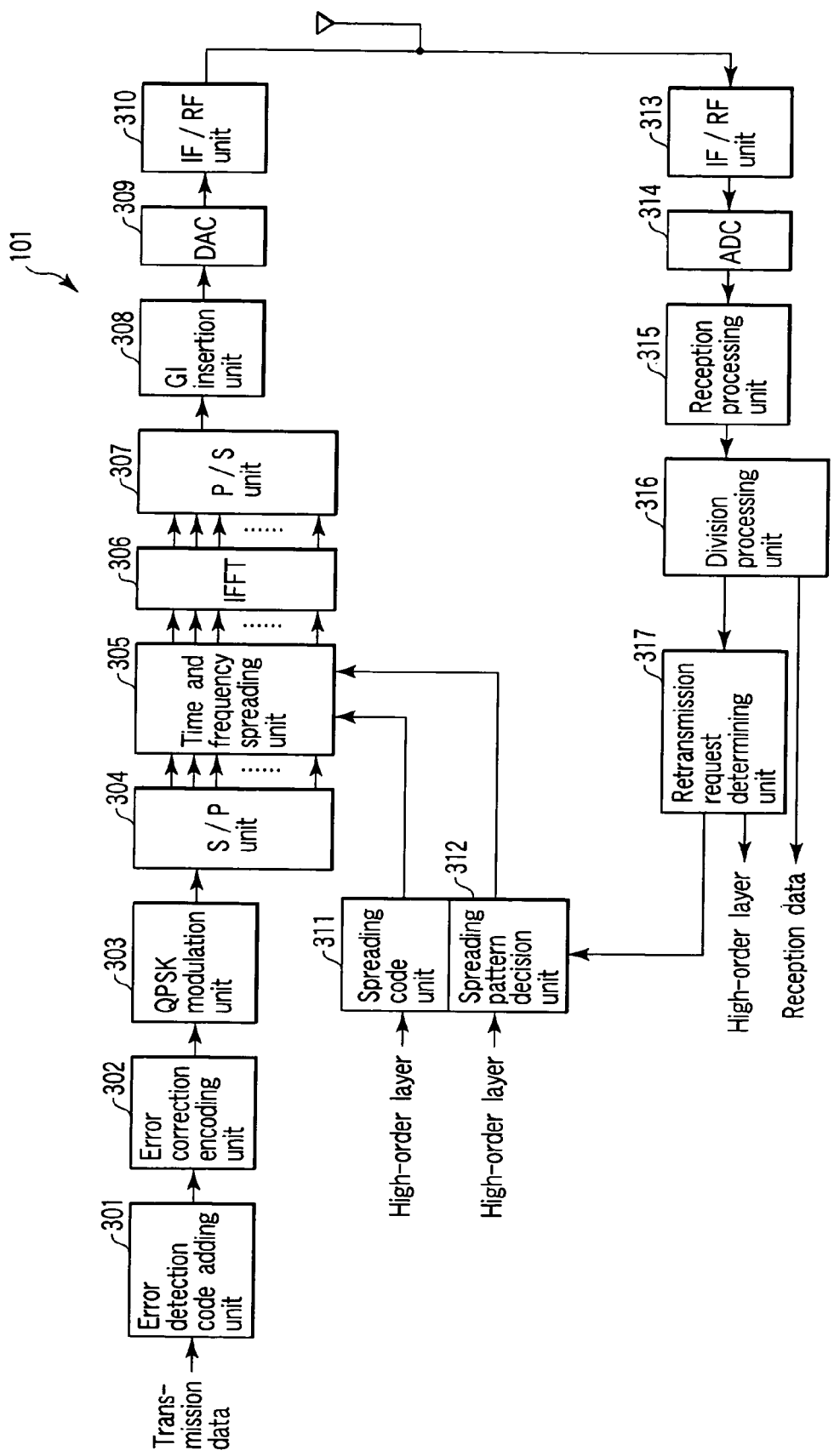
F I G. 3

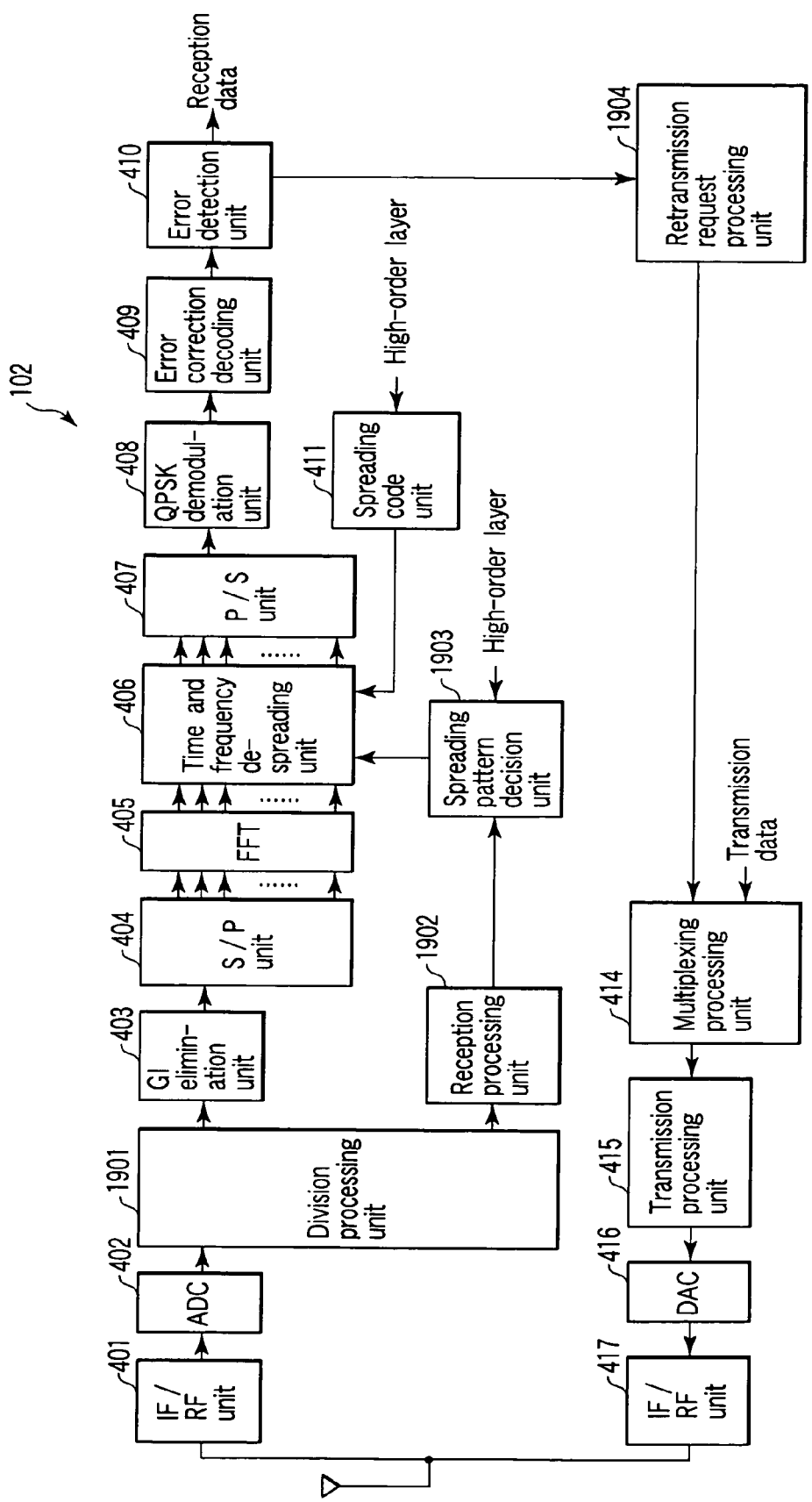
F I G. 19

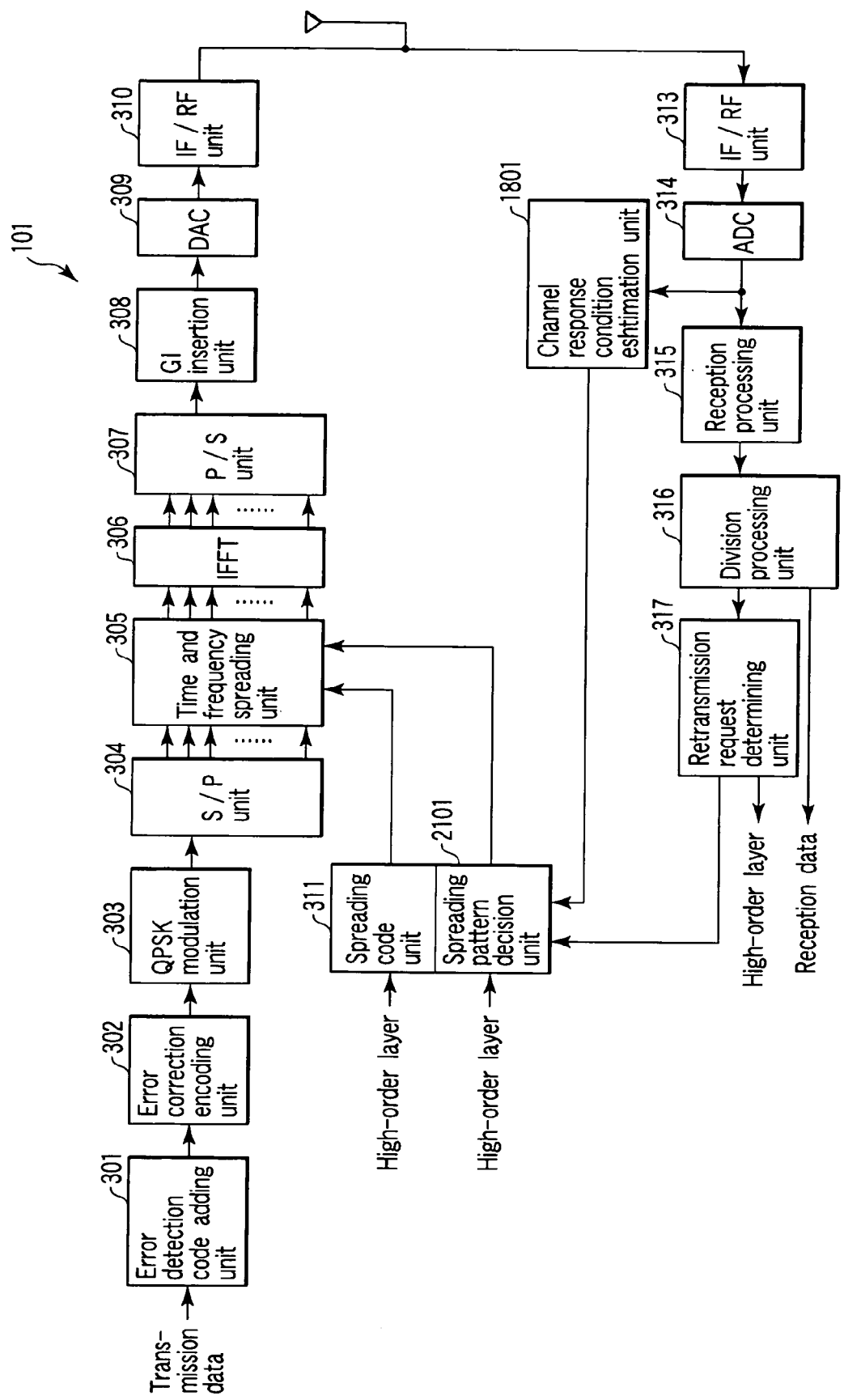
F I G. 21

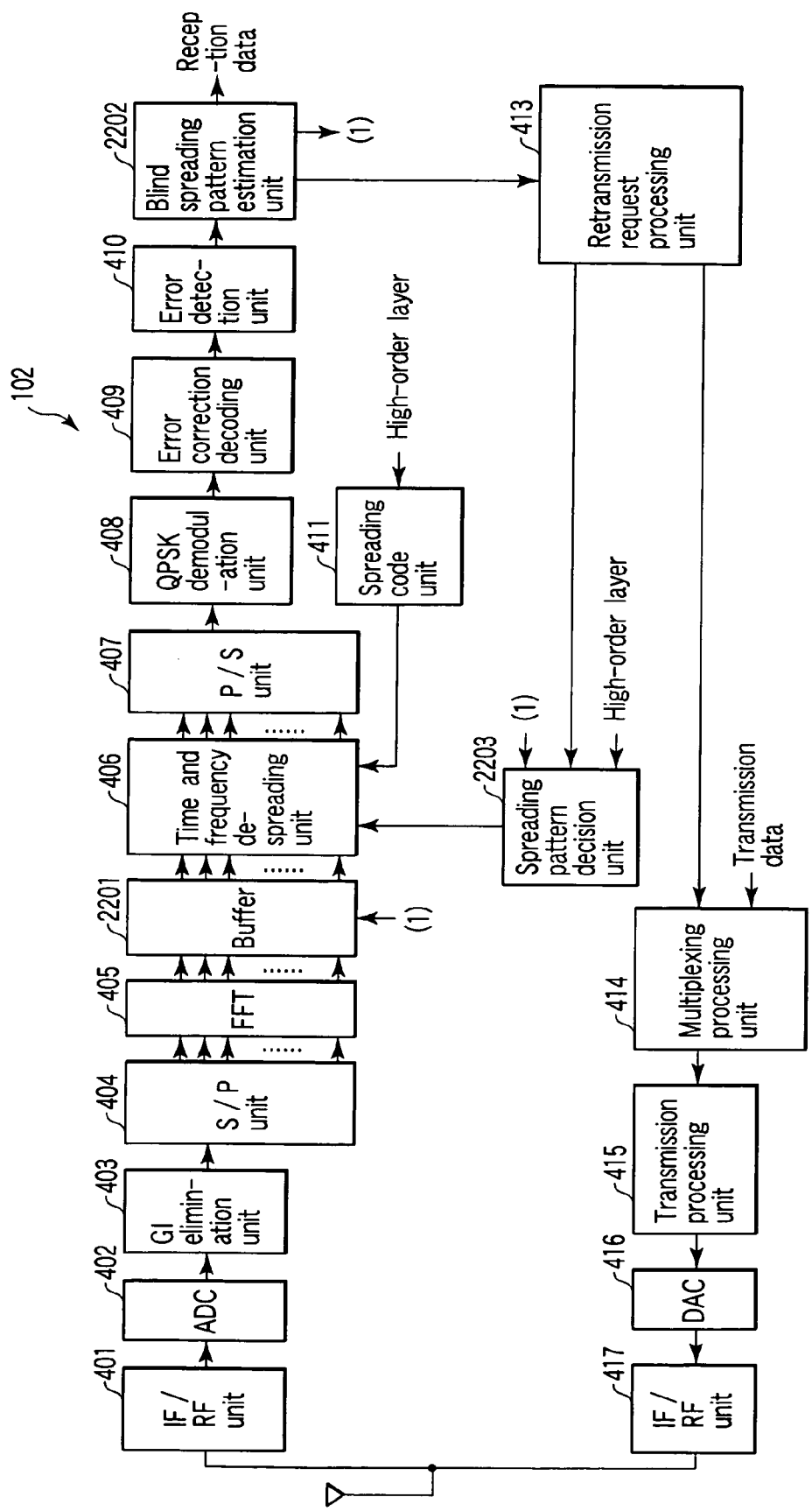
F I G. 22

RADIO COMMUNICATION SYSTEM AND RADIO TRANSMITTER

CROSS-REFERENCE TO RELATED APPLICATIONS

This is a Continuation Application of PCT Application No. PCT/JP2005/024159, filed Dec. 22, 2005, which was published under PCT Article 21(2) in English.

This application is based upon and claims the benefit of priority from prior Japanese Patent Application No. 2004-372182, filed Dec. 22, 2004, the entire contents of which are incorporated herein by reference.

BACKGROUND OF THE INVENTION

1. Field of the Invention

The present invention relates generally to a radio communication system and a radio transmitter in multi-carrier code-division multiple access (CDMA) radio communication, and more particularly to such a radio communication system and a radio transmitter which correct errors caused by retransmissions.

2. Description of the Related Art

In a retransmission control system in conventional multi-carrier communication, a mobile station and a base station execute the following processes (refer to, for example, Jpn. Pat. Appln. KOKAI Publication No. 2004-104574). The mobile station measures receiving channel qualities at every subcarrier or at every subcarrier group to transmit the channel qualities to the base station. The mobile station requests a retransmission to the base station if there is an error in received data received from the base station. The base station receives the request for the retransmission to transmit retransmission data to the mobile station. At this time, the base station uses a subcarrier other than a subcarrier or a subcarrier group which are determined not to be used, based on the receiving channel qualities to transmit the retransmission data.

However, there is the problem that the above-mentioned conventional technique requires a large overhead to feed back information about a channel response status and a subcarrier to be used to a transmission side. There is the problem that system throughput in communication should be improved and processing amount for retransmission control and channel response estimation should be reduced.

BRIEF SUMMARY OF THE INVENTION

In accordance with a first aspect of the invention, there is provided a radio communication system comprising:

a radio transmitter comprising:

an adding unit configured to add a parity bit for error detection to data; a spreading unit configured to spread, in a time direction and a frequency direction, the data with the parity bit, based on a spreading pattern; a transmission unit configured to transmit the spread data; and a reception unit configured to receive a retransmission request signal, wherein in response to the retransmission request signal, the spreading unit spreads to-be-retransmitted data with the parity bit, based on a varied spreading pattern which is varied according to at least one of the spreading rate in the time direction and the spreading rate in the frequency direction, and the transmission unit transmits the spread to-be-retransmitted data; and a radio receiver comprising: a reception unit configured to receives the transmitted spread data; a de-spreading unit configured to de-spread the received spread data, based on the spreading pattern; an error detection unit configured to detect an error of the de-spread data, based on the parity bit; and a transmission unit configured to transmit the retransmission request signal requesting a retransmission of the data if the error is detected in the de-spread data, wherein the reception unit receives retransmitted data, and the de-spreading unit de-spreads the retransmitted data, based on the varied spreading pattern.

In accordance with a second aspect of the invention, there is provided a radio transmitter comprising: an adding unit configured to add a parity bit for error detection to data; a spreading unit configured to spread, in a time direction and a frequency direction, the data with the parity bit, based on a spreading pattern; a transmission unit configured to transmit the spread data; and a receiving unit configured to receive, from a radio receiver, a retransmission request signal requesting for a retransmission of the spread data if an error is detected in the spread data, wherein the spreading unit, in response to the retransmission request signal, spread retransmission data with the parity bit, based on the spread pattern which is varied according to at least one of a spreading rate in the time direction and a spreading rate in the frequency direction, and the transmission unit transmits the retransmission data.

BRIEF DESCRIPTION OF THE SEVERAL VIEWS OF THE DRAWING

FIG. 3 is a block diagram of the transmitter regarding the first embodiment of the invention;

FIG. 19 is a block diagram of the receiver regarding the fourth embodiment of the invention;

FIG. 21 is a block diagram of the transmitter regarding the fifth embodiment of the invention; and FIG. 22 is a block diagram of the receiver regarding the fifth embodiment of the invention.

DETAILED DESCRIPTION OF THE INVENTION

Hereinafter, a radio communication system and a radio transmitter regarding embodiments of the present invention will be described in detail with reference to the drawings.

Figure 1:
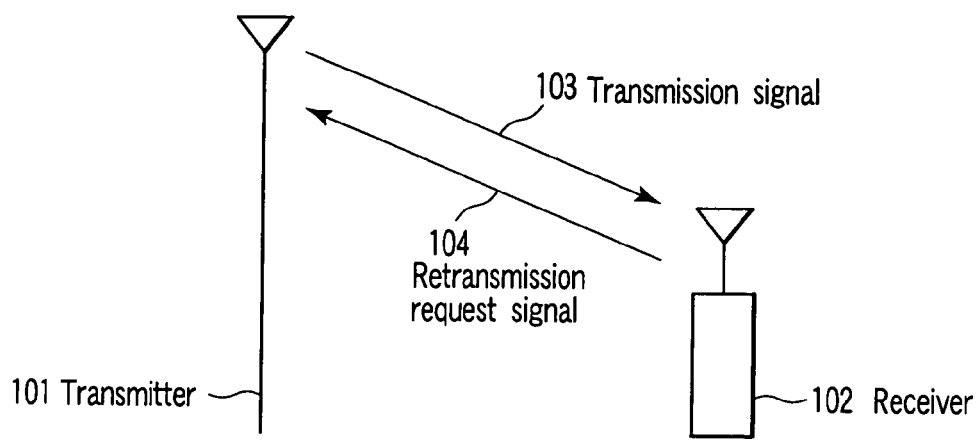
FIG. 1 is a view showing transactions of signals between radio communication systems regarding embodiments of the present invention.

The radio communication system regarding the embodiment is composed of, as shown in FIG. 1, a transmitter 101 and a receiver 102. The transmitter 101 and the receiver 102 perform radio communication with each other by multi-carrier CDMA signals. The transmitter 101 transmits a transmission signal 103 to the receiver 102. When cannot receiving the transmission signal 103 correctly, the receiver 102 transmits a retransmission request signal 104 to the transmitter 101. The transmitter 101 which has received the retransmission request signal transmits data for which there is a retransmission request to the receiver 102 again.

An object of the embodiment of the present invention is to solve the above-described problems and provide the radio communication system and the radio transmitter for reducing a process amount for retransmissions and channel response estimation.

The radio communication system and the radio transmitter of the embodiments of the invention can reduce the processing amount for the retransmissions and the channel response estimation.

FIRST EMBODIMENT

An example of processes at the transmitter 101 and the receiver 102 regarding the first embodiment will be described by referring to FIG. 2. In this embodiment, spreading patterns used for the transmitter 101 and the receiver 102 are set in advance.

At first, the transmitter 101 and the receiver 102 perform spreading pattern decision processes for transmitting and receiving data, respectively, before transmitting the data (step S201 and step S205). These spreading patterns are decided among the transactions between the transmitter 101 and the receiver 102 at the time of establishment of synchronization between the transmitter 101 and the receiver 102. The spreading patterns are notified from a high-order layer. The spreading patterns also may be those uniquely decided by notification information from the transmitter 101 and a unique index of the receiver 102.

Next, the transmitter 101 applies a transmission process to data Dk (k is a data packet number) by using the spreading pattern selected in the step S201 (step S202). This transmission process performs error correction encoding, spreading, modulation and the like. The transmitter 101 transmits the transmission-processed data Dk as transmission data Dk(0) to the receiver 102. Here, the number in parenthesis indicates the number of times of retransmissions.

Here, it is assumed that an error has occurred between the transmitter 101 and the receiver 102 for one reason or another. The receiver 102 applies a reception process to data with an error generated therein (step S206). On this occasion, the receiver 102 performs error correction decoding and makes a retransmission request for the data Dk to the transmitter 101 if the error cannot be corrected even by the performance of the error correction decoding.

The transmitter 101, which has received the retransmission request for the data Dk, applies a spreading pattern decision process at the retransmission (step S203). After transmitting the retransmission request for the data Dk, the receiver 102 applies the spreading pattern decision process in the retransmission approximately simultaneously with the step S203 (step S207). The identical spreading patterns can be obtained in the spreading pattern decision processes in the retransmissions by the transmitter 101 (step S203) and by the receiver 102 (step S207) if the same conditions exist therein.

After this, the transmitter 101 applies a retransmission process to the data Dk (step S204), and spreads the data Dk by using the spreading pattern obtained in the step S203 to transmit data Dk(1). The receiver 102 applies a reception process to the data Dk(1) by using the spreading pattern obtained in the step S207 (step S208).

Next, the transmitter 101 regarding the embodiment will be described with reference to FIG. 3.

The transmitter 101 comprises an error detection code adding unit 301, an error correction encoding unit 302, a quadrature phase-shift keying (QPSK) modulation unit 303, a serial-to-parallel conversion (SIP) unit 304, a time and frequency spreading unit 305, an inverse fast Fourier transformer (IFFT) 306, a parallel-to-serial conversion (P/S) unit 307, a guard interval (GI) insertion unit 308, a digital-to-analog converter (DAC) 309, intermediate-frequency/radio-frequency (IF/RF) units 310, 313, a spreading code unit 311, a spreading pattern decision unit 312, an analog-to-digital converter (ADC) 314, a reception processing unit 315, a division processing unit 316 and a retransmission request determining unit 317.

The error detection code adding unit 301 adds parity bits for performing error detection to the data to be transmitted from the transmitter 101. The parity bits for the error detection added from the adding unit 301 are, for example, those of a cyclic redundancy check code (CRC).

The encoding unit 302 applies an error correction encoding process to the transmission data. As to the error correction encoding process performed by the encoding unit 302 is, for example, convolution coding, turbocoding, low-density parity check (LDPC) coding or the like.

The QPSK modulation unit 303 maps the error correction encoding processed data onto a plane composed of I signals and Q signals. Here, although the QPSK system is utilized as a modulation system, another modulation system such as a quadrature amplitude modulation (QAM) system or a 7C/4 shift QPSK system may be useful.

The S/P unit 304 converts a serial signal modulated by the QPSK modulation unit 303 into a parallel signal.

The time and frequency spreading unit 305 inputs a spreading code from the spreading code unit 311 and inputs a spreading pattern from the spreading pattern decision unit 312 to perform a two-dimensional spreading process to the parallel signal, based on these spreading codes and spreading patterns. The spreading pattern includes spreading rates in a time direction and a frequency direction.

In the IFFT 306, the two-dimensionally spread signal is inverse-Fourier transformed to be converted into a signal on an orthogonal frequency. After this, the P/S unit 307 converts the parallel signal transformed by the IFFT 306 into a serial signal through a parallel-to-serial conversion.

The GI insertion unit 308 inserts a GI into the serial signal which is an output from the P/S unit 307. The DAC 309 performs a digital-to-analog process on the signal with the GI inserted thereto to convert the signal to an analog signal. The IF/RF unit 310 performs an intermediate-frequency conversion and a radio-frequency conversion of the output signal from the DAC 309 to convert it into a signal of a radio frequency and transmits the converted signal to the receiver 102 through an antenna.

The IF/RF unit 313 converts the signal received through the antenna and from the receiver 102 into a signal having a baseband frequency. ADC 314 performs an analog-to-digital conversion process on the reception signal converted into the baseband frequency to convert it into a digital signal. The reception processing unit 315 decodes the reception signal converted into the digital signal and performs error correction decoding. The reception processing unit 315 corresponds with a below-mentioned transmitting processing unit 415 in the receiver 102.

The division processing unit 316 divides the reception signal obtained from reception processing unit 315 into the reception signal and the retransmission request signal, if present.

The retransmission request determining unit 317 uses the retransmission request signal to determine that which packet should be retransmitted. The determining unit 317 instructs a procedure to a high-order layer to retransmit the packet to which a retransmission request is made and requests for varying the spreading pattern in the retransmission to the spreading pattern decision unit 312.

The spreading pattern decision unit 312 receives the request from the determining unit 317 to decide the spreading pattern for the packet to which the retransmission request is made from the high-order layer. The spreading pattern includes the spreading rates in the time direction and the frequency direction.

The spreading code unit 311 decides the spreading code for the packet to which the retransmission request is made from the high-order layer.

Figure 4:
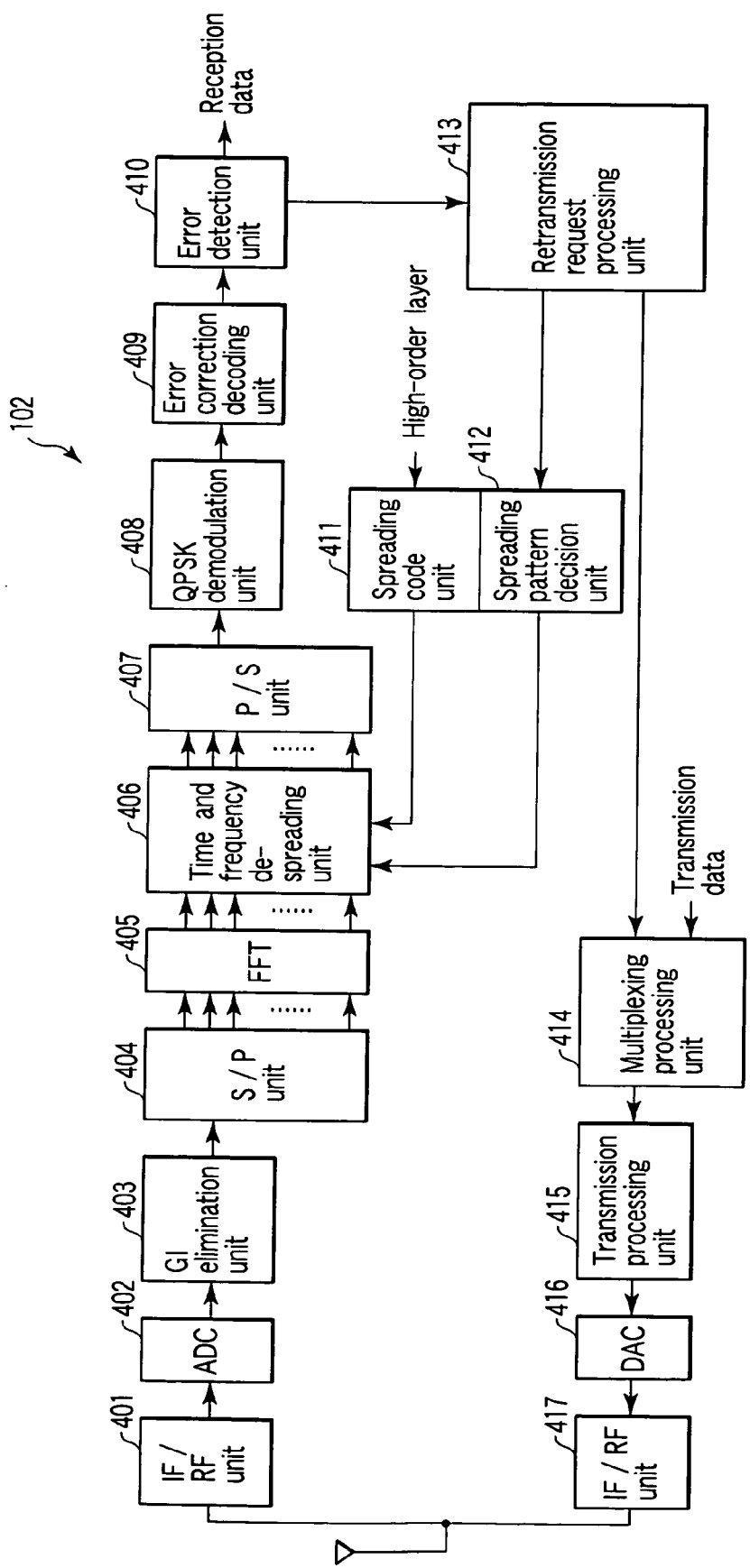
FIG. 4 is a block diagram of the receiver regarding the first embodiment of the invention.

Next, the receiver 102 regarding the embodiment will be described with reference to FIG. 4.

The receiver 102 comprises an IF/RF unit 401, an ADC 402, a GI elimination unit 403, an S/P unit 404, an FFT 405, a time and frequency de-spreading unit 406, a P/S unit 407, a QPSK demodulation unit 408, an error correction decoding unit 409, an error detection unit 410, a spreading code unit 411, a spreading pattern decision unit 412, a retransmission request processing unit 413, a multiplex processing unit 414, a transmission processing unit, a DAC 416 and an IF/RF unit 417.

The IF/RF unit 401 the reception signal transmitted from the transmitter 101 and received at the antenna converts into a signal with a baseband frequency. The ADC 402 converts the signal with the baseband frequency into a digital signal. The GI elimination unit 403 eliminates the GI from the reception signal converted into the digital signal. The S/P unit 404 converts the signal from which the GI is eliminated into a parallel signal. FFT 405 converts this parallel signal into a time axis signal.

The time and frequency de-spreading unit 406 inputs the spreading code from the spreading code unit 411 and inputs the spreading pattern from the spreading pattern decision unit 412 to perform a two-dimensional de-spreading process on the parallel signal, based on the spreading code and the spreading pattern. The spreading pattern includes the spreading rates in the time direction and the frequency direction. The P/S unit 407 converts the de-spread reception signal into a serial signal. The QPSK demodulation unit 408 QPSK-demodulates the serial signal output from the P/S unit 407. The demodulation process performed herein corresponds to a modulation process performed by the QPSK modulation unit 303 of the transmitter 101. Accordingly, if the transmitter 101 uses another modulation system for the modulation process, the receiver 102 also performs a demodulation process corresponding to the modulation process.

The error correction decoding unit 409 performs an error correction demodulation process for the demodulated reception signal. The decoding unit 409 also performs an error correction decoding process, corresponding to the error correction encoding unit 302 of the transmitter 101, for example, Viterbi decoding, turbodecoding, LDCP decoding or the like.

The error detection unit 410 detects whether or not there is any error in the reception signal to which the error correction decoding process is applied. The error detection unit 410 detects an error by using the parity bits added from the error detection code adding unit 301 of the transmitter 101. If no error is detected in the reception signal, the error detection unit 410 reports the reception signal as a correct reception signal to the high-order layer.

Conversely, if an error is detected in the reception signal, the detection unit 410 performs a process to request the retransmission of the corresponding packet.

The retransmission request processing unit 413 receives an output from the detection unit 410 to specify a symbol group (here, referred to as a "slot") with an error generated therein by receiving the output from the detection unit 410. The processing unit 413 outputs the retransmission request to the multiplex processing unit 414 and also requests the change of the spreading pattern in the retransmission to the processing unit 412 after deciding the slot to which the retransmission request should be made.

The retransmission request signal generated from the processing unit 413 may output an instruction to the spreading pattern decision unit 412 so that the request signal is spread by a certain spreading pattern which is previously decided between the transmitter 101 and the receiver 102. The spreading pattern for spreading the retransmission request signal may be decided in advance on a system and may be controlled in advance so as to become the same spreading patterns between the transmitter 101 and the receiver 102 by previously storing some spreading patterns in the processing unit 413 and the determining unit 317.

The decision unit 412 receives the request from the processing unit 413 to decide the spreading patterns for the packet to which the retransmission request is made. The spreading pattern includes the spreading rates in the time direction and the frequency direction.

The spreading code unit 411 decides the spreading code for the packet to which the retransmission request is made from the high-order layer.

The multiplex processing unit 414 performs a multiplexing process for the retransmission request together with the transmission data. The multiplex processing unit 414 multiplexes a plurality of items of data by using, for example, time multiplexing, frequency multiplexing and code multiplexing. The transmission processing unit 415 modulates a transmission signal that is an output from the multiplex processing unit 414 and performs error correction coding. The transmission processing unit 415 corresponds to the reception processing unit 315 of the transmitter 101. The DAC 416 converts the output signal from the transmission processing unit 415 into an analog signal. The IF/RF unit 417 performs an intermediate-frequency conversion and a radio-frequency conversion of this analog signal to convert it into a signal with a radio frequency and transmits the converted signal to the transmitter 101 through the antenna.

Next, the spreading pattern decision processes in FIG. 2 (steps S201, S203, S205 and S207) and the spreading pattern decision units 312 and 412 in FIG. 3 and FIG. 4 will be described by referring to FIG. 5.

Figure 2:
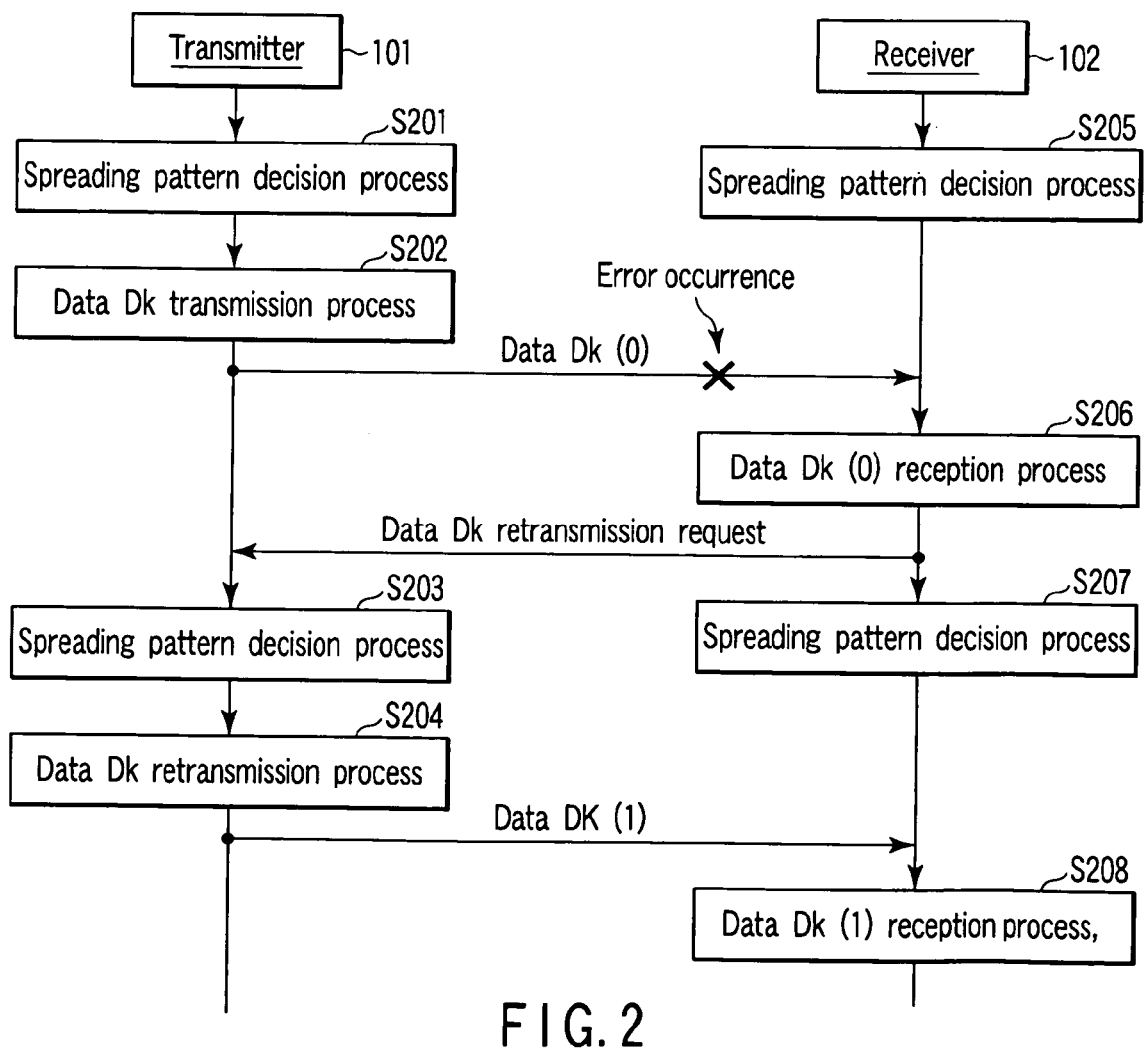
FIG. 2 is a flowchart showing an example of processes at a transmitter and a receiver regarding a first embodiment of the invention.
Figure 5:
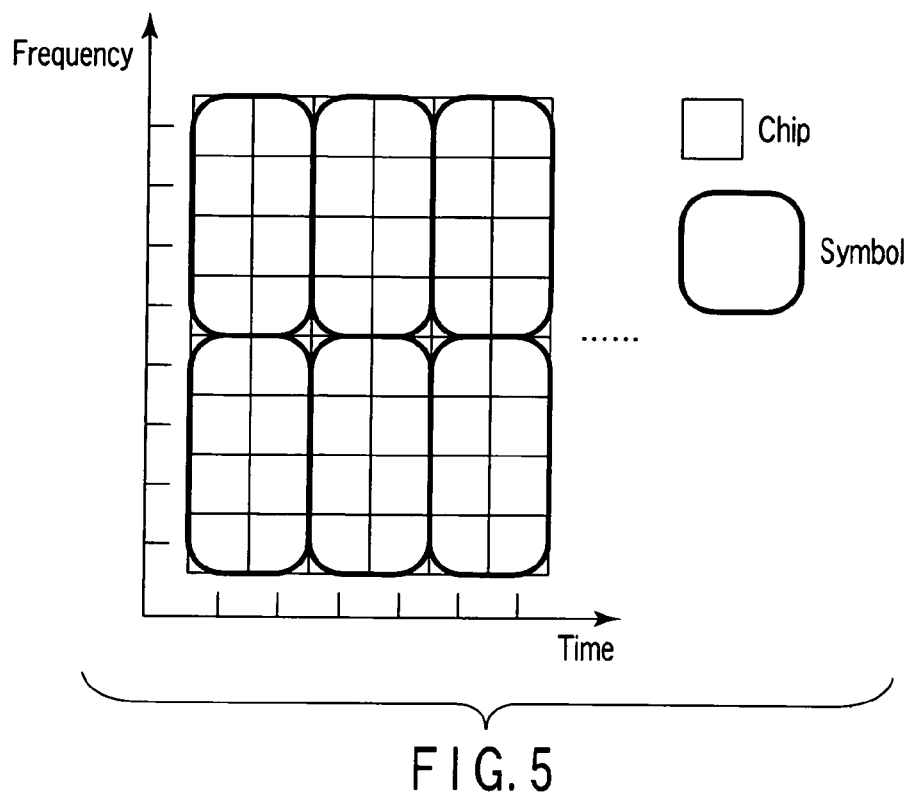
FIG. 5 is a view showing an example of a spreading pattern with a frequency spreading rate of 4 and a time spreading rate of 2.

In the steps S201 and S205 among the spreading pattern decision processes in FIG. 2, the spreading pattern is, for example, a pattern shown in FIG. 5. That is, it is assumed that the spreading pattern has a spreading rate $SF\_freq\_1$ of 4, a time spreading rate $SF\_time\_1$ of 2, and a spreading rate as the CDMA $SF\_freq\_1 \times SF\_time\_1$ of 8, in other words, the spreading pattern is one which is one symbol by 8 chips. Such a spreading pattern has a large frequency spreading rate compared to a time spreading rate, so that a relatively higher error rate is presented in a channel response environment of which the time fluctuation is hard. However, a relatively lower error rate is presented in a channel response environment of which the frequency selectivity fading is hard. Accordingly, in this spreading pattern, there is a high possibility for the error generation shown in FIG. 2 to be generated in the channel response environment of which the time fluctuation is hard.

Here, a propagation environment of which the frequency selectivity fading is hard indicates the case that generation chip intervals of power weakening at every subcarrier caused by the frequency selectivity fading is shorter than those of power weakening caused by the time fluctuation and a spreading gain in the frequency direction cannot be sufficiently obtained. For example, in the case of use of 1,024 subcarriers by using a 20-MHz band, the chip intervals for spreading in the frequency direction becomes almost 20 kHz. In this case, the generation of the power weakening caused by fading in the frequency direction with 40-kHz intervals by the frequency selectivity fading caused by multi-path makes the generation chip intervals of the power weakening in the frequency direction be 2-chip. If the Doppler frequency of the fading is expressed by the formula: fd=10 kHz and its symbol length is 10 ms, the generation chip intervals of the power weakening in the time direction becomes 10-chip. In such a case, the propagation environment becomes one of which the frequency selectivity fading is hard then a large spreading rate in the frequency direction can make the transmission error rate low.

Conversely, a propagation environment of which the time fluctuation is hard indicates the case in which the generation chip intervals of the power weakening caused by time fluctuation is shorter than those of the power weakening at every subcarrier caused by the frequency selectivity fading and the spreading gain in the time direction cannot be sufficiently obtained.

Next, the spreading pattern decision processes in the retransmission in FIG. 2 (steps S203 and S207) and the spreading pattern decision units 312 and 412 in FIG. 3 and FIG. 4 will be described by referring to FIG. 6.

Figure 6:
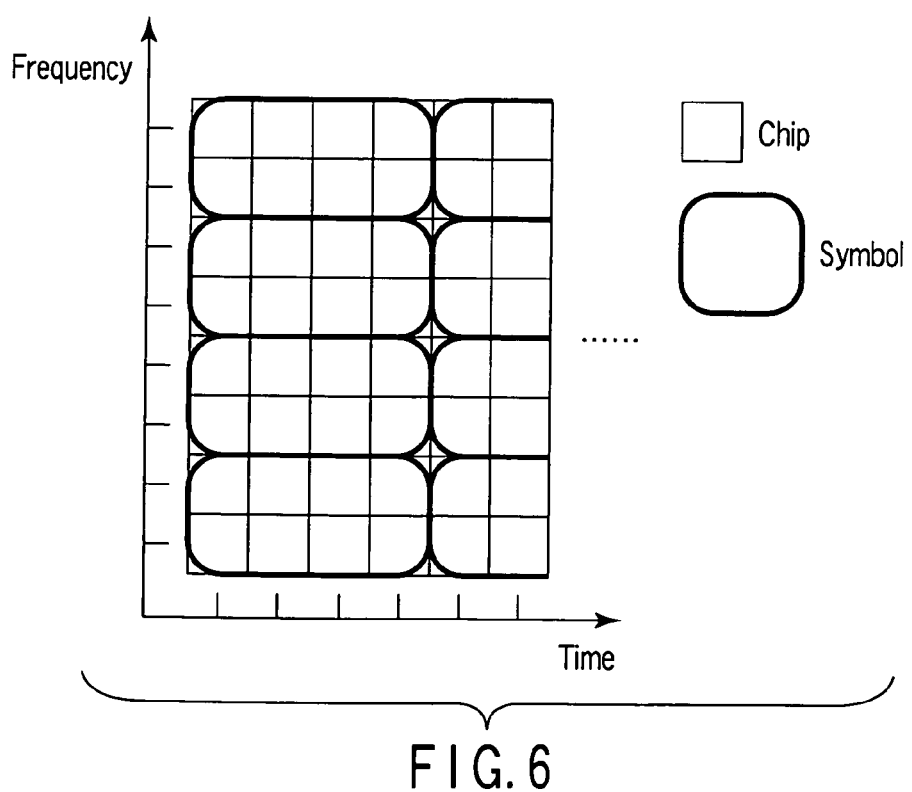
FIG. 6 is a view showing an example of a spreading pattern with the frequency spreading rate of 2 and the time spreading rate of 4.

In steps S203 and S207 to be the spreading pattern decision processes in the retransmission in FIG. 2, the spreading pattern is, for example, one shown in FIG. 6. That is, it is assumed that this spreading pattern has the frequency spreading rate $SF\_freq\_1$ of 2, the time spreading rate $SF\_time\_1$ of 4, and the spreading rate $SF\_freq\_1 \times SF\_time\_1$ of 8, namely, has one symbol by 8 chips. Such a spreading pattern has a large time spreading rate compared to a frequency spreading rate, so that a relatively lower error rate is presented in a channel response environment of which time fluctuation is hard. In contrast, a relatively higher error rate is presented in a channel response environment in which the frequency selectivity fading is hard. As mentioned above, the error generation environment in FIG. 2 in the case of use of the spreading pattern in FIG. 5 has a high possibility of the case of the hard time fluctuation, so that it becomes possible to lower the possibility of the error rate in the retransmission by using such spreading pattern shown in FIG. 6. And in the case of hard frequency fading, the occurrence of the retransmission is low in possibility, so that the degradation of a degree of the error rate becomes low by using such spreading pattern shown in FIG. 6.

Next, a relation between a symbol error rate (SER) and the first data transmission and the second data transmission will be described by referring to FIG. 7. Here, the second data transmission indicates a retransmission process performed in data transmission at the first time. The retransmission is performed at every one slot, and one slot is composed of 1,024 symbols. A maximum retransmission time is set to one time. The throughput is indicated by the number of transmission success symbols in the transmission of 10,000 slots. For example, if the frequency spreading rate $SF\_freq\_1$ is 4 and the time spreading rate $SF\_time\_1$ is 2 as shown in FIG. 5, it is assumed that the symbol error rate is 2.00e-03, and if the frequency spreading rate $SF\_freq\_1$ is 2 and the time spreading rate $SF\_time\_1$ is 4 as shown in FIG. 6, it is assumed that the symbol error rate is 1.00e-05. At this time, the throughput becomes a 1,315 k symbol, if such a spreading pattern as that shown in FIG. 5 is used in the first transmission and retransmission.

On the other hand, in the radio communication system of the embodiment, such a spreading pattern as that shown in FIG. 5 is used in the first transmission and such a spreading pattern as that shown in FIG. 6 is used in the retransmission. In this case, the throughput becomes a 5,343 k symbol then it can be dramatically improved. In the case of use of such a spreading pattern as that in FIG. 6 in the transmission and the retransmission, the throughput becomes 9,905 k symbol. Furthermore, in the radio communication system in the embodiment, when such a spreading pattern as that in FIG. 6 is used in the first transmission and such a spreading pattern as that in FIG. 5 in the retransmission, the throughput becomes 9,233 k symbol to be slightly lowered, but it is not brought into large deterioration.

Figure 7:
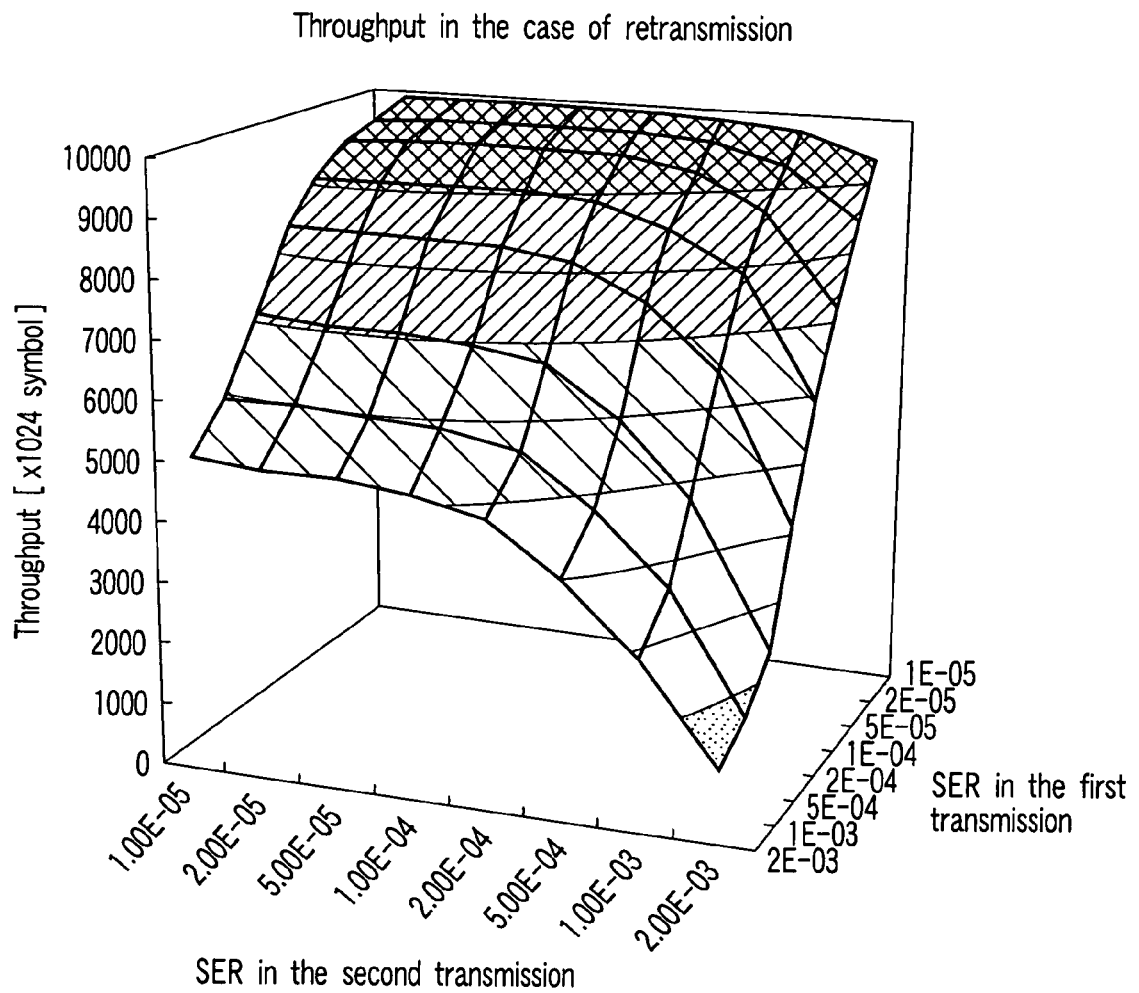
FIG. 7 is a view showing a relation between throughput and symbol error rates in the first data transmission and in the second data transmission.

In an environment in which a symbol error rate is uniformly present as shown in FIG. 7, the throughput in the case of varying a spreading pattern in an retransmission becomes a 7,450 k symbol by using the radio communication system regarding the embodiment. Then, the throughput can exceed a symbol of about 7,160 k that is one in the case of use of a conventional system which does not vary the spreading pattern in the retransmission. Accordingly, the number of times of retransmissions can be decreased as the whole of the system and the system throughput can be improved.

As described above, according to the radio communication system regarding the first embodiment, the number of retransmissions of the whole of the system is decreased and the system throughput can be improved without causing a large amount of overheads with respect to processes such as estimation of a channel response and its feedback or the throughput.

SECOND EMBODIMENT

Figure 8:
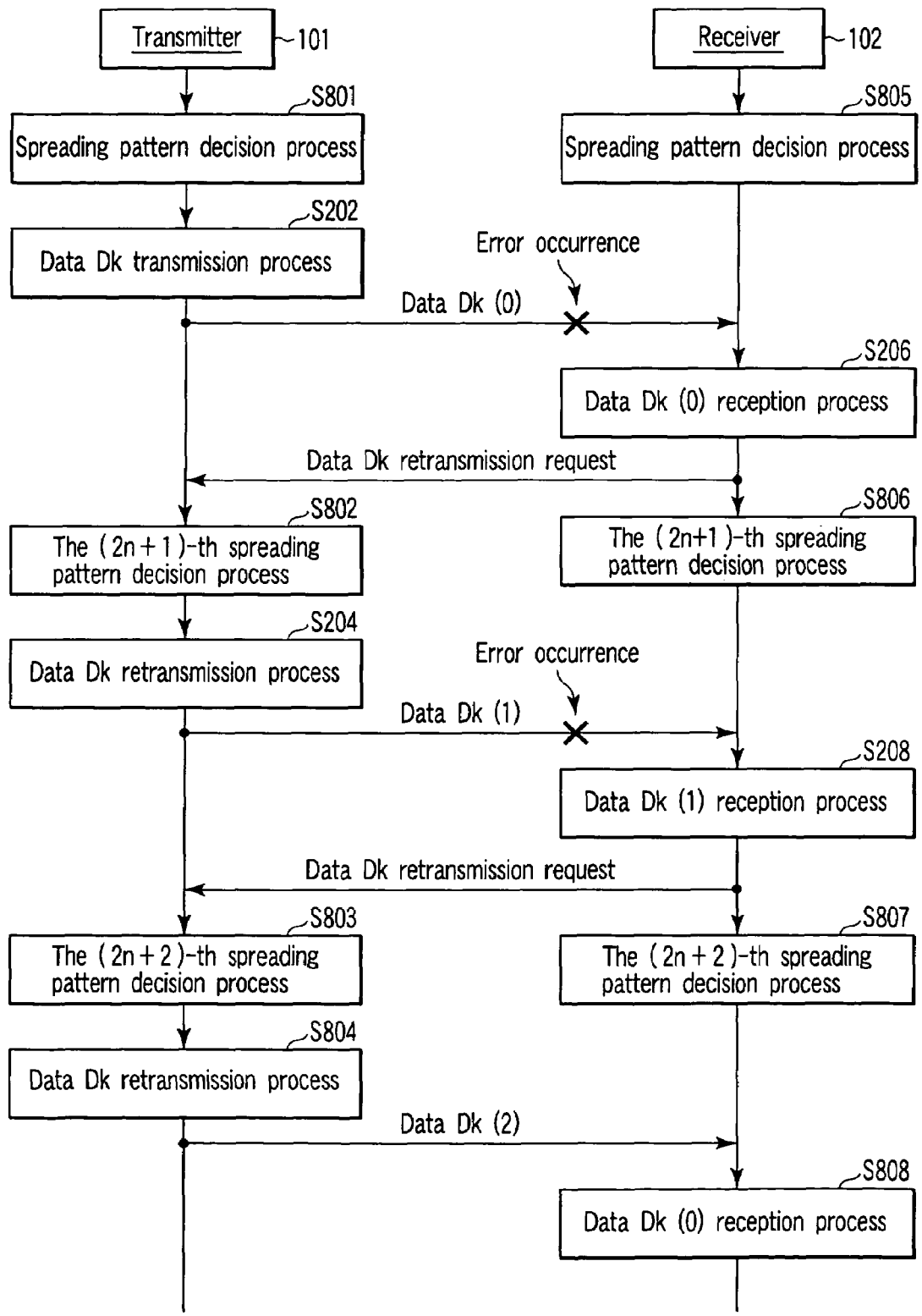
FIG. 8 is a flowchart showing an example of processes at a transmitter and a receiver regarding a second embodiment of the invention.

An example of processes at the transmitter 101 and the receiver 102 regarding the second embodiment will be described with reference to FIG. 8. In this embodiment, a spreading pattern is set by referring to a history of successes and otherwise of retransmissions. The transmitter 101 and the receiver 102 decide spreading patterns by using the same algorithms and data. The same steps as those described in the first embodiment by referring to FIG. 2 will be given the same reference marks as those of FIG. 2 and explanations about the steps will be skipped.

At first, before transmitting the data, the transmitter 101 and the receiver 102 perform spreading pattern decision processes for transmitting and receiving the data, respectively (step S801 and step S805). These spreading patterns are specified from high-order layers so that they are decided as those low in error rate with reference to previous error occurrence conditions. At this time, the transmitter 101 and the receiver 102 decide the spreading patterns by using the same algorithms and data so as to match the spreading patterns between the transmitter 101 and the receiver 102. Here, the transmitter 101 and the receiver 102 select, for example, the spreading pattern shown in FIG. 9 (frequency spreading rate SF_freq_1 of 2 and time spreading rate SF_time_1 of 2)

Next to this, the transmitter 101 performs the transmission process of the data (step S202), and when an error is caused in the data Dk (0) between the transmitter 101 and the receiver 102 for some reason, the receiver 102 performs error correction decoding (step S206). The receiver 102 makes a retransmission request for the data Dk to the transmitter 101 if the error cannot be corrected by the error correction decoding.

Since the retransmission is the first one in relation to the data Dk, the transmitter 101 which has received the retransmission request for the data Dk conducts a spreading pattern decision process in a retransmission in odd numbered time (step S802). After transmitting the retransmission request for the data Dk, the receiver 102 performs a spreading pattern decision process in the retransmission in odd numbered time at substantially the same time as that of the step S802 (step S806). The spreading pattern decision process at the transmitter 101 (step S802) and that at the receiver 102 (step S806) can respectively obtain the same spreading rates if they are in the same conditions. Here, the spreading patterns are selected by using the previous error rates for each spreading pattern. The transmitter 101 and the receiver 102 select, for example, such spreading patterns (frequency spreading rate SF_freq_2 of 4 and time spreading rate SF_time_2 of 1) shown in FIG. 10.

After this, the transmitter 101 applies a retransmission process to the data Dk (step S204), spreads it by using the spreading pattern obtained in step S802 and transmits data Dk (1). The receiver 102 applies a reception process to the data Dk (1) by using the spreading pattern obtained in step S806 (step S208). Furthermore, if the error cannot be corrected even here, the receiver 102 makes a retransmission request for the data Dk to the transmitter 101 again.

Since the transmitter 101, which has received the retransmission request for the data Dk, conducts the second retransmission therefor, the transmitter 101 performs a spreading pattern decision process in a retransmission in even numbered time (step S803). After transmitting a retransmission request, the receiver 102 also performs a spreading pattern decision process in the retransmission in even numbered time (step S807). The spreading pattern decision processes at the transmitter 101 (step S803) and at the receiver 102 (step S807) can respectively obtain the same spreading patterns if they are in the same conditions. Here, the transmitter 101 and the receiver 102 select, for example, such spreading patterns (frequency spreading rate SF_freq_2 of 1 and time spreading rate SF_time_2 of 4) shown in FIG. 11 by using the previous error rates for each spreading pattern.

Then, the transmitter 101 applies a retransmission process to the data Dk (step S804), spreads it by using the spreading rate obtained in step S803 to transmit data Dk (2). The receiver 102 applies a reception process to the data Dk (2) by using the spreading pattern obtained in step S807 (step S808).

Figure 12:
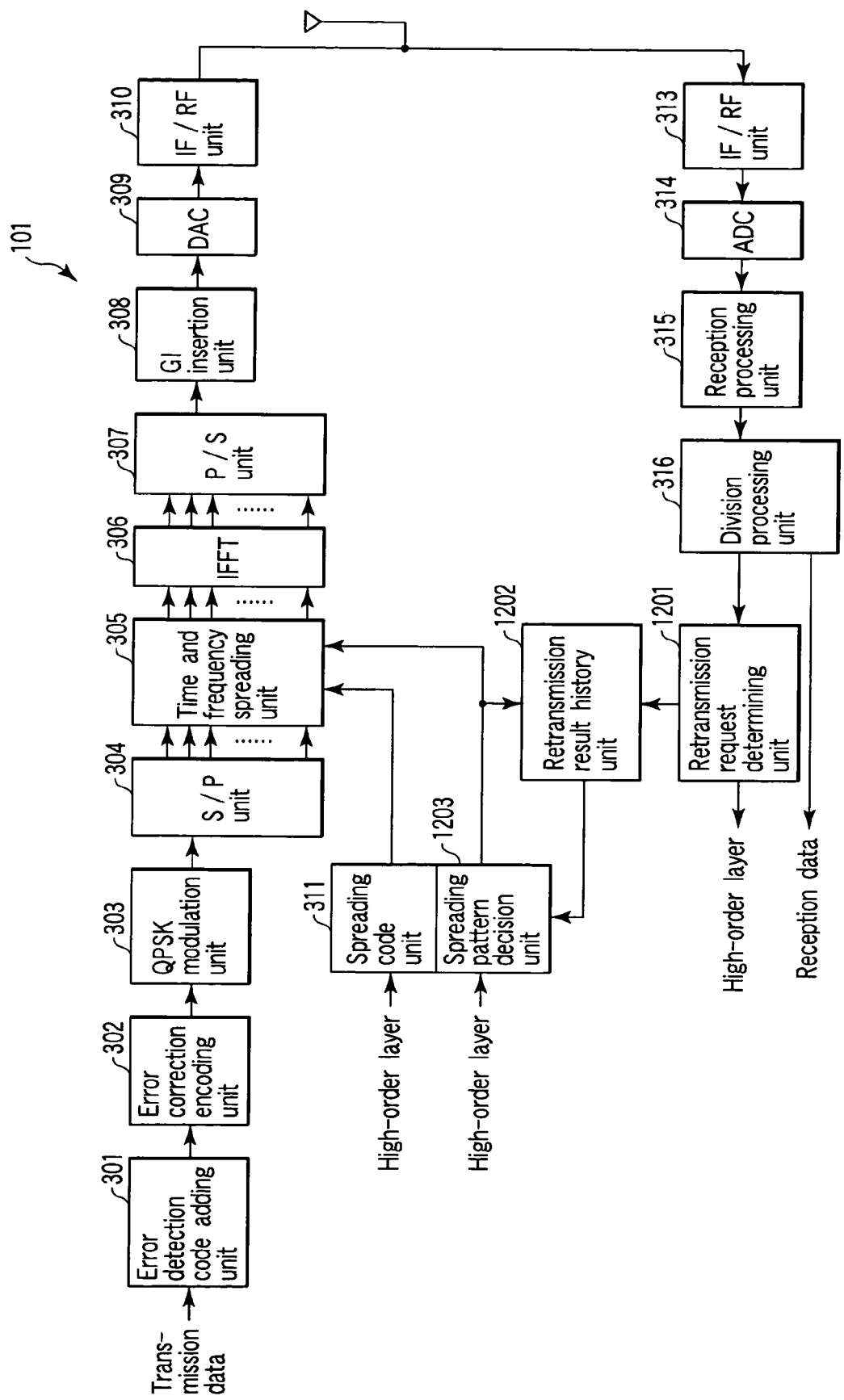
FIG. 12 is a block diagram of the transmittter regarding the second embodiment of the invention.

Next, the transmitter 101 regarding the embodiment will be described by referring to FIG. 12. The same units as those of the apparatus which has described for the first embodiment by referring to FIG. 3 will be put the same reference numbers as those of FIG. 3 and description thereof will be eliminated.

A retransmission request determining unit 1201 determines that which packet should be retransmitted, by using the retransmission request signal. The determination unit 1201 instructs a procedure to retransmit the packet with the retransmission request made thereto to a high-order layer and also store the result of a success or failure in a transmission together with the used spreading pattern into a retransmission result history unit 1202.

The history unit 1202 stores the result, from a spreading pattern decision unit 1203, of the success or failure in the transmission in the case of use of each spreading pattern together with the spreading pattern to be used in the transmitter 101. The history unit 1202 requests to the decision unit 1203 for varying the spreading pattern in the retransmission.

The spreading pattern decision unit 1203 receives the spreading pattern and its error rate history and selects a spreading pattern low in error rate from a previous history for a packet to which a retransmission request is made from the high-order layer. The selected spreading pattern includes a spreading rate in a time direction and a frequency direction. The decision unit 1203 outputs the spreading pattern to the time and frequency spreading unit 305 and the history unit 1202.

Figure 9:
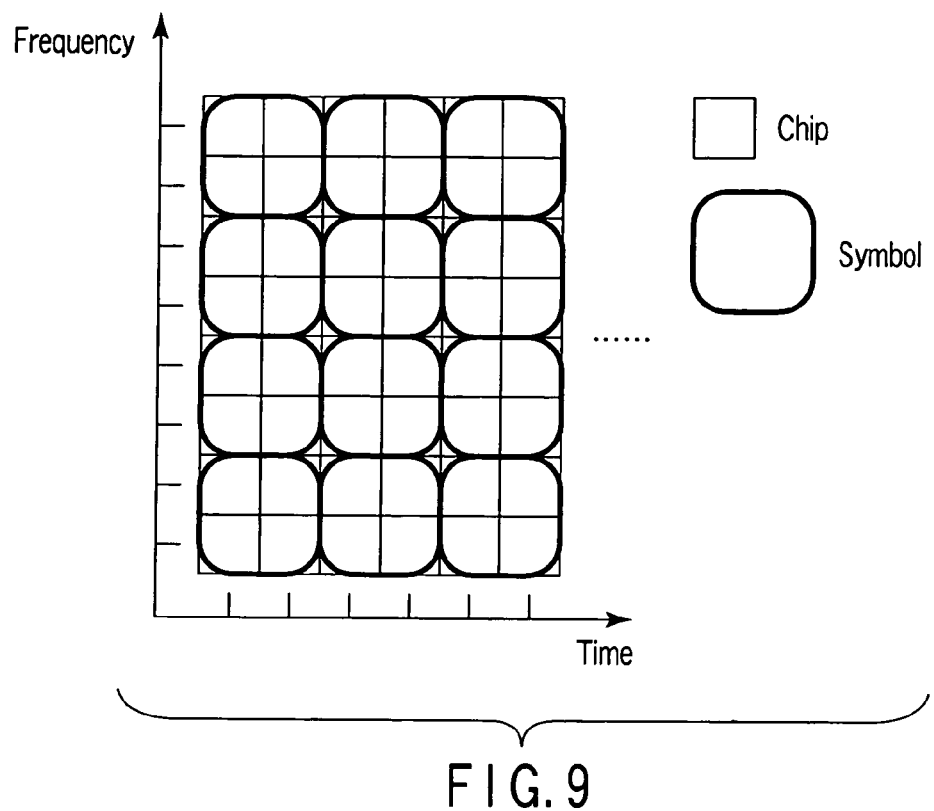
FIG. 9 is a view showing an example of a spreading pattern with the frequency spreading rate of 2 and the time spreading rate of 2.
Figure 10:
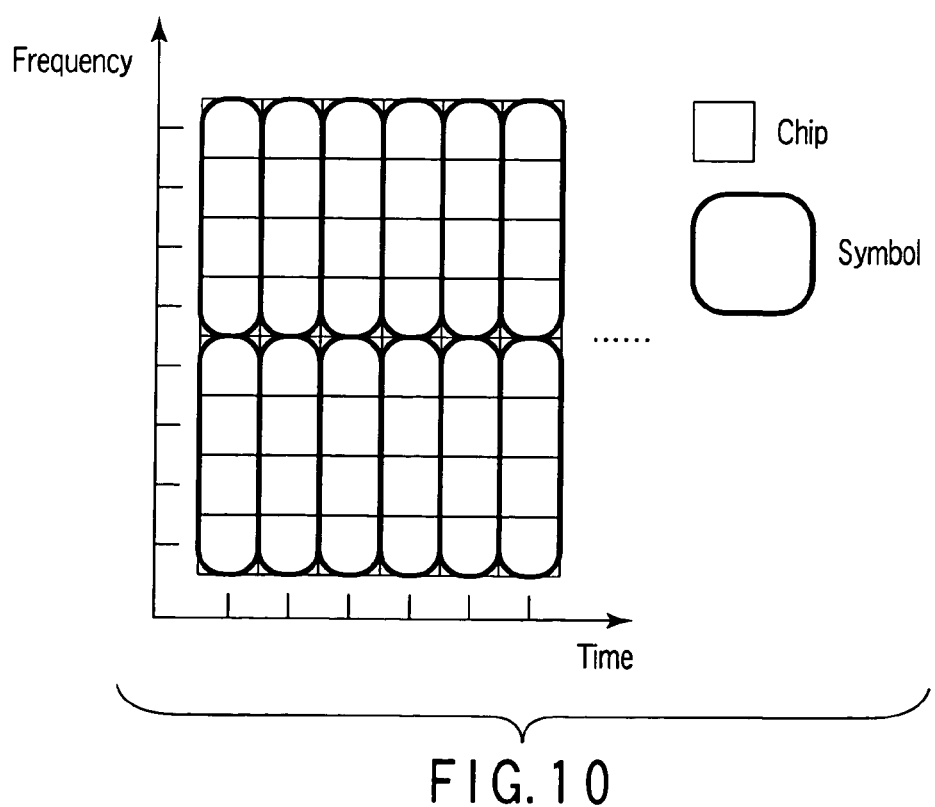
FIG. 10 is a view showing an example of a spreading pattern with the frequency spreading rate of 4 and the time spreading rate of 1.
Figure 11:
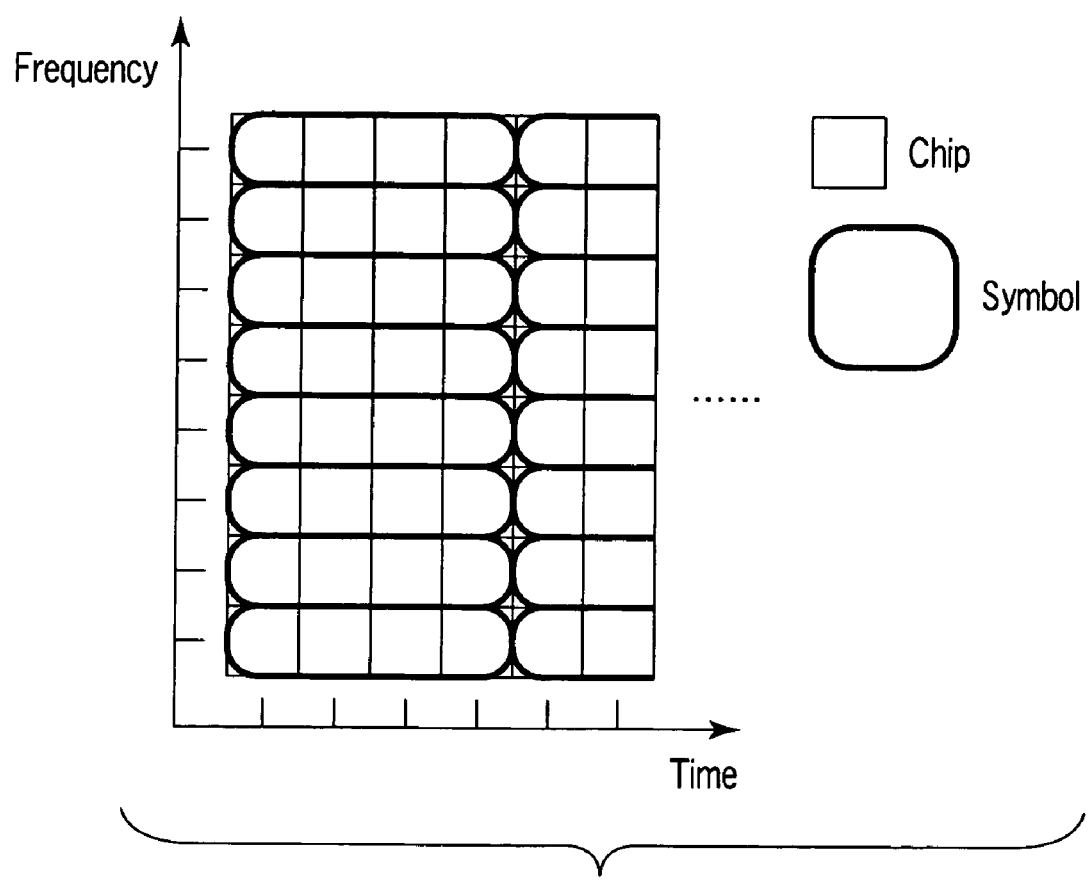
FIG. 11 is a view showing an example of a spreading pattern with the frequency spreading rate of 1 and the time spreading rate of 4.

When transmitting, for example, the Dk (0), the decision unit 1203 selects a spreading pattern shown in FIG. 9 among spreading patterns in FIGS. 9, 10 and 11, if the error rate of the spreading pattern in FIG. 9 is the smallest error rate.

When transmitting the data Dk (1) in accordance with the retransmission request from the high-order layer, if the spreading pattern in FIG. 10 is lower in error rate than that of the spreading pattern in FIG. 11, since it is predicted that the channel response for this transmission will be hard in frequency selectivity fading, the decision unit 1203 selects a spreading pattern so as to make a frequency spreading rate large as shown in FIG. 10.

When transmitting the data Dk (2) in accordance with another retransmission request, since it is predicted that the state of the channel response has already varied, the decision unit 1203 selects such spreading pattern to make the time spreading rate shown in FIG. 11 large in contrast to the data Dk (1)

As mentioned above, the radio transmitter regarding the embodiment can enhance accuracy of an error rate in the retransmission result history process by alternately varying patterns which preferentially makes spreading rates large for each retransmission. Thereby, the transmitter can decrease the number of times of retransmissions and improve the system throughput.

Figure 13:
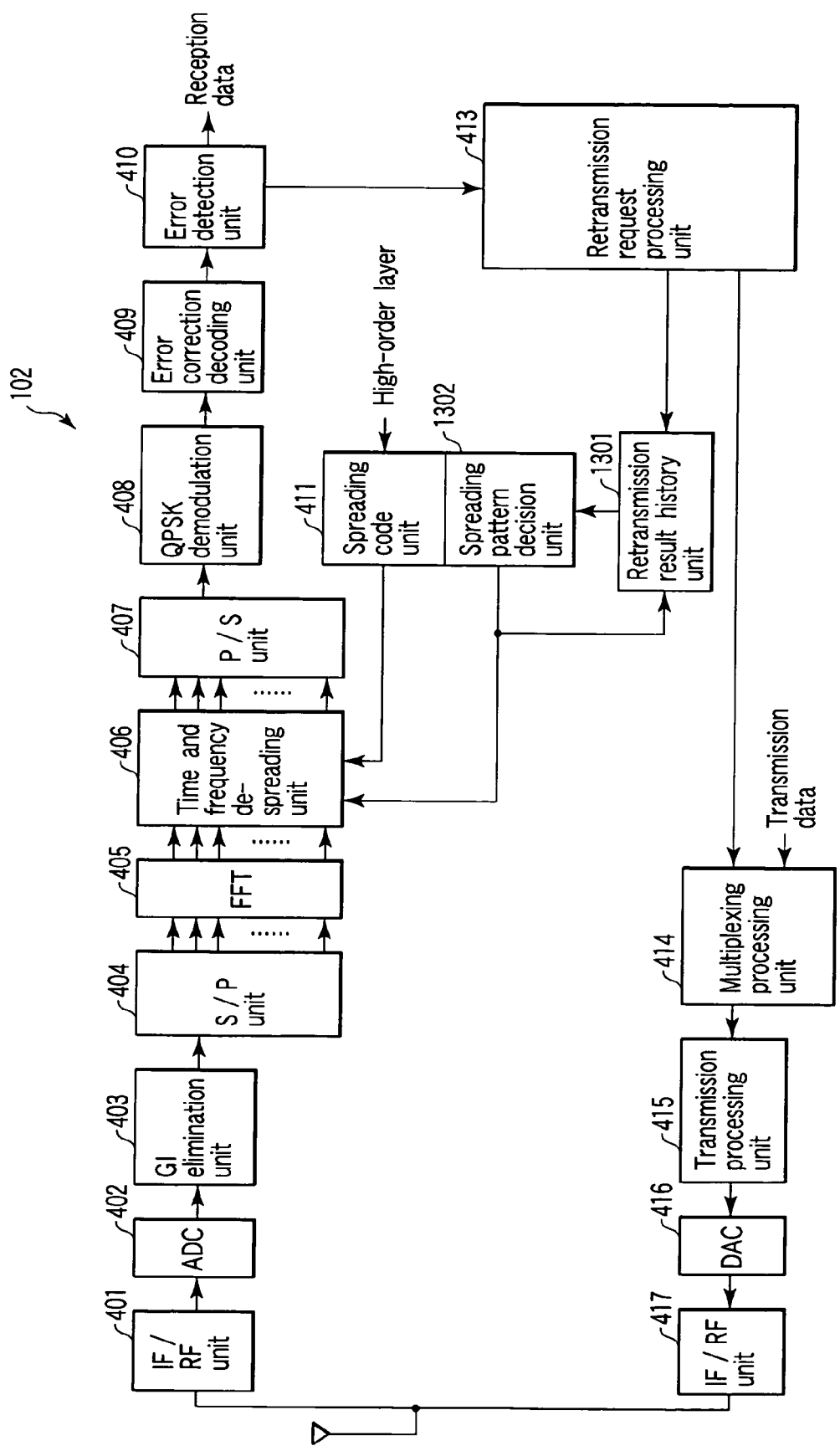
FIG. 13 is a block diagram of the receiver regarding the second embodiment of the invention.

Next to this, the receiver 102 regarding the embodiment will be described with reference to FIG. 13. The same units as the apparatus units which have been described by referring to FIG. 4 for the first embodiment will be given the same reference numbers as those of FIG. 4 and explanations thereof will be skipped.

A retransmission result history unit 1301 stores a request for a change of a spreading pattern in a retransmission, that is an output from the retransmission request processing unit 413 to output a signal which requests a change of the spreading pattern in retransmission to a spreading pattern decision unit 1302. The history unit 1301 inputs the spreading pattern decided by the decision unit 1302 and associates the decided spreading pattern with the request for the change of the spreading pattern in the retransmission to store it therein.

The decision unit 1302 inputs the signal for requesting the change of the spreading pattern from the history unit 1301 to decide a spreading pattern for the packet for requesting the retransmission. The decision unit 1302 outputs the decided spreading pattern to the history unit 1301 and also to the time and frequency de-spreading unit 406. The decision unit 1302 decides a spreading pattern by using the same algorithm as that used at the decision unit 1203 of the transmitter 101.

As mentioned above, the radio communication system regarding the second embodiment can specify the cause of errors by varying a dimension (time and frequency) alternately making the spreading rates large in a channel response of which the time direction fluctuation is hard or in a channel response of which the frequency direction fluctuation is hard. Then, the communication system regarding this embodiment can decrease the number of times of retransmissions. Therefore, the communication system can decrease the number of times of a whole system to improve the system throughput without causing a large overhead with respect to processes and throughput of estimation of channel response and its feedback.

THIRD EMBODIMENT

Figure 14:
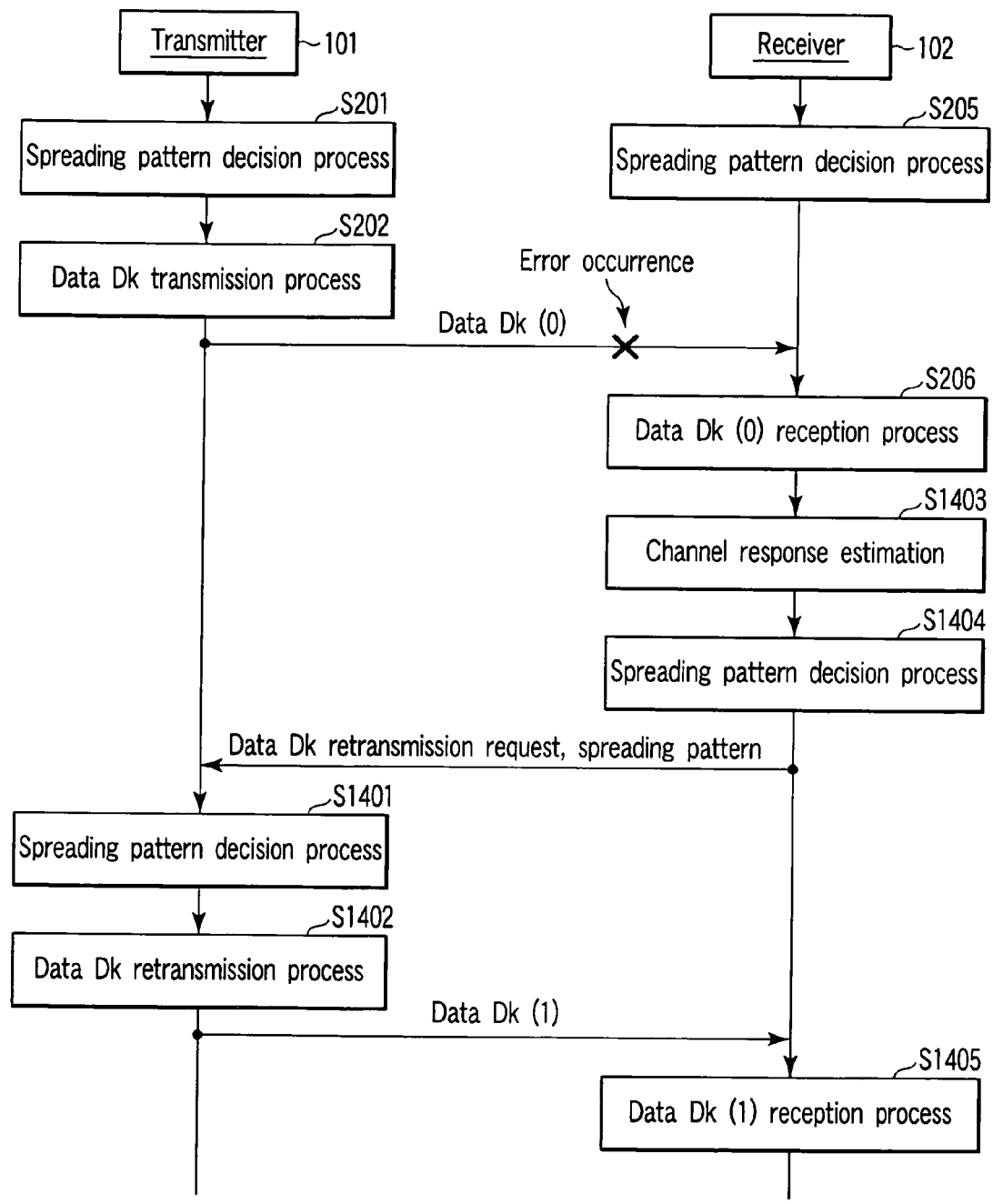
FIG. 14 is a flowchart showing an example of processes at a transmitter and a receiver regarding a third embodiment of the invention.

An example of processes in the transmitter 101 and the receiver 102 regarding the third embodiment will be described by referring to FIG. 14. In the embodiment, the receiver 102 decides a spreading pattern, based on the channel response estimation to notify the spreading pattern to the transmitter 101. The same steps which have been described with respect to the first embodiment by referring to FIG. 2 will be put the same reference marks as those in FIG. 2 and explanations thereof will be skipped.

At first, the transmitter 101 and the receiver 102 conduct step S201 and step S205, respectively. In steps S201 and S205, like the second embodiment, a spreading pattern low in error rate among the error rates in the cases of use of the previous spreading pattern and the spreading patterns decided by the transmitter 101 and the receiver 102 may be selected.

Next, the transmitter 101 executes step S202 and transmits the transmission data Dk (0) to the receiver 102. At this point, it is assumed that an error occurs by some cause in the data Dk (0) between the transmitter 101 and the receiver 102. The receiver 102 applies a data reception process to the data with an error is generated therein (step S206).

At this time, if an error correction cannot be achieved even by performing error correction decoding, the receiver 102 performs a transmission estimation process, based on the received data (step S1403). In step S1403, a time expansion and a time fluctuation of a multi-path are estimated.

Next to this, step S1404 decides a spreading pattern by using the time expansion and the time fluctuation of the multi-path obtained in the channel response estimation process. For example, in the case that the time expansion of the multi-path exceeds a threshold, the receiver 102 determines that a transmission path is one the channel response of which is hard in frequency selectivity fading and generates a spreading pattern higher in frequency spreading rate than the spreading pattern which has been used in the data Dk (0). And in the case that the time fluctuation of the multi-path exceeds a threshold, the receiver 102 determines that the transmission path is one the channel response of which is hard in time fluctuation and generates a spreading pattern larger in time spreading rate than the spreading pattern which has been used in the data Dk (0). These thresholds are decided in advance by a simulation or an experimental test, etc., in dependence on a propagation environment, performance of the radio communication system and the like. The receiver 102 transmits the spreading pattern generated in step S1404 together with the request for the retransmission of the data Dk.

The transmitter 101 receives the retransmission request of the data Dk and the spreading pattern for the retransmission thereof to adopt the spreading rate instructed from the receiver 102 (step S1401). In step S1402, the transmitter 101 applies a transmission process to the data Dk by using the spreading pattern adopted in step S1401 to transmit it as data Dk (1) to the receiver 102. The receiver 102 applies a reception process to the data Dk (1) by using the spreading pattern decided in step S1404 (step S1405).

Figure 15:
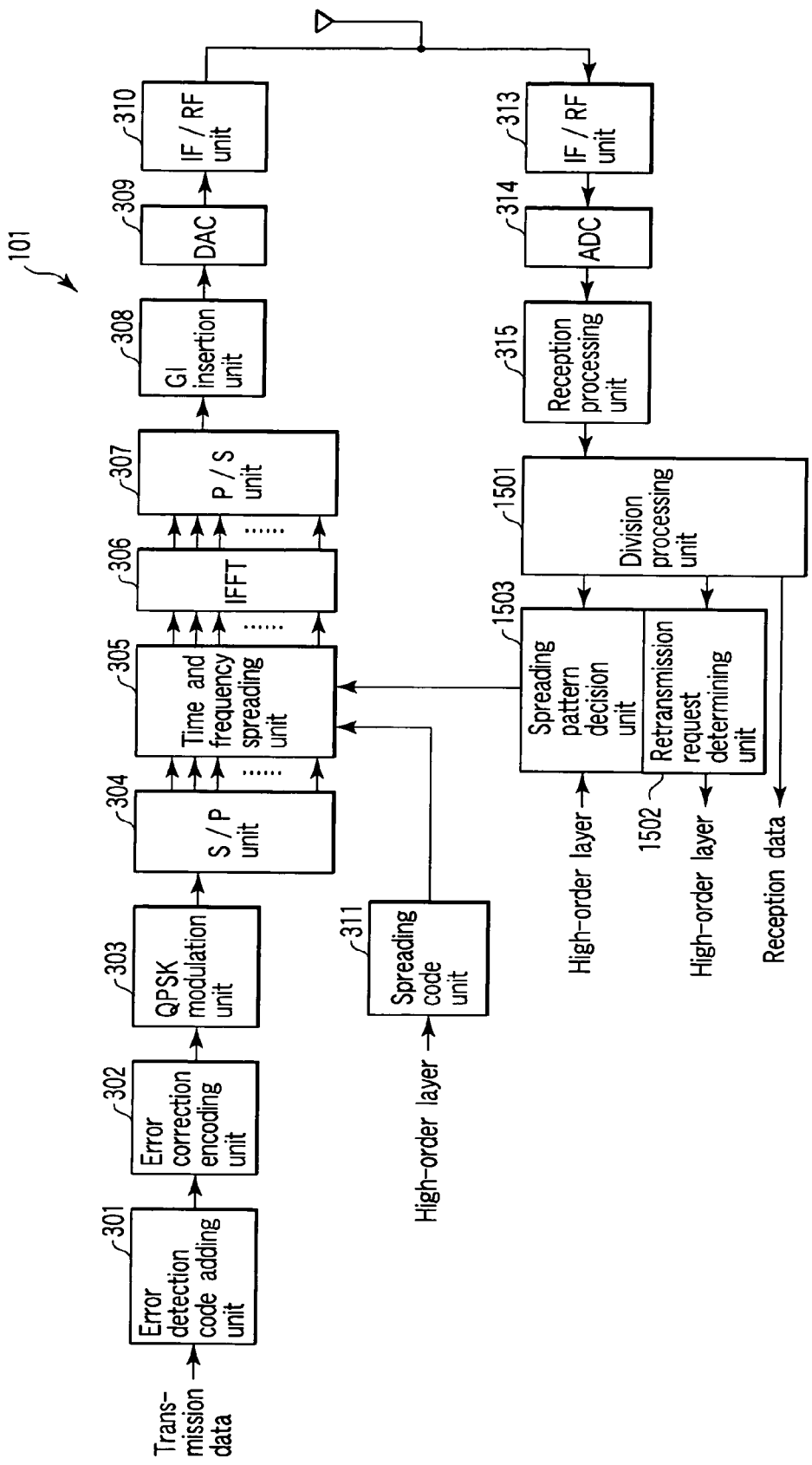
FIG. 15 is a block diagram of the transmitter regarding the third embodiment of the invention.

Next to this, the transmitter 101 regarding the embodiment will be described by referring to FIG. 15. The same units as those of the apparatus which is described in the first embodiment by referring to FIG. 3 will be designated by the same reference numbers and explanations thereof will be skipped.

A division processing unit 1501 divides the reception signal received at the reception processing unit 315 into three, which are reception data, a retransmission request, if present, and spreading pattern information. The spreading pattern information received together with the retransmission request may be a time spreading rate, a frequency spreading rate and an index capable of uniquely deciding these spreading rates.

A retransmission request determining unit 1502 inputs a retransmission request from the division processing unit 1501 to determine that which packet should be retransmitted. The determining unit 1502 instructs a procedure to retransmit the packet to which the retransmission request is made to a high-order layer.

A spreading pattern decision unit 1503 inputs the spreading pattern information from the division processing unit 1501 to decide a spreading pattern to the packet to which the retransmission request has been made from the high-order layer. Then, the decision unit 1503 outputs the decided spreading pattern to the time and frequency spreading unit 305. The decision unit 1503 decides a spreading pattern, based on the information instructed from the high-order layer in the transmission of the data Dk (0). At this moment, the high-order layer may instruct the spreading pattern itself and may instruct a previous error rate to individual spreading patterns to have the decision unit 1503 decide a spreading pattern corresponding to this error rate.

Next to this, the receiver 102 regarding the embodiment will be described by referring to FIG. 16. The same units as apparatus units which have been described in the first embodiment with reference to FIG. 4 will be designated by the same reference numbers and explanations about the same units will be eliminated.

A channel response estimation unit 1601 estimates a condition of multi-path to output the estimated condition to a spreading pattern decision unit 1602.

The decision unit 1602 decides a spreading pattern to a packet to which a retransmission request has been made from a high-order layer, based on information, which is input from the retransmission request processing unit 413, about a slot to be retransmitted and based on information about a channel response acquired from the estimation unit 1601. The decision unit 1602, for example, if a time expansion of multi-path exceeds a threshold, determines that the receiver 102 is present in a state of which the frequency selectivity fading is hard and selects a spreading pattern larger in frequency spreading rate than that used in the data Dk (0).

The receiver 102 may output an instruction to the spreading pattern decision unit 412 so that the retransmission request signal generated from the retransmission request processing unit 413 and the spreading pattern information to notify the spreading pattern are distributed by means of a certain spreading pattern which is decided in advance between the transmitter 101 and the receiver 102. The spreading pattern to spread the retransmission request signal and the spreading pattern information may be decided in the system in advance. Some spreading patterns are stored in the retransmission request processing unit 413 and in the retransmission request determining unit 317, then, the receiver 102 may control in advance so that the transmitter 101 and the receiver 102 adapt the same patterns with each other.

If the time fluctuation in multi-path exceeds the thresholds, the decision unit 1602 determines that the channel response of which the time fluctuation is hard and selects a spreading pattern larger in time spreading rate than that used at the data Dk (0). These thresholds are decided in advance by means of a simulation or an experimental test and the like in dependence on the propagation environment, the performance of the radio communication system, or the like. The decision unit 1602 outputs the decided spreading pattern to the time and frequency de-spreading unit 406 and a multiplexing processing unit 1603.

The processing unit 1603 multiplexes information which is input from the retransmission request processing unit 413 and related to a slot to be retransmitted, a spreading pattern which is input from the spreading pattern decision unit 1602, and transmission data.

As mentioned above, according to the radio communication system regarding the third embodiment performs, if a transmission error occurs, the receiver estimates a channel response and notifies an optimum spreading pattern together with the retransmission request, then, the number of times of retransmissions can be surely decreased. Thereby, the radio communication system in the embodiment can improve the system throughput by limiting the overheads with respect to processing and throughput to the minimum and decreasing the number of times of retransmissions of the whole system.

FOURTH EMBODIMENT

Figure 17:
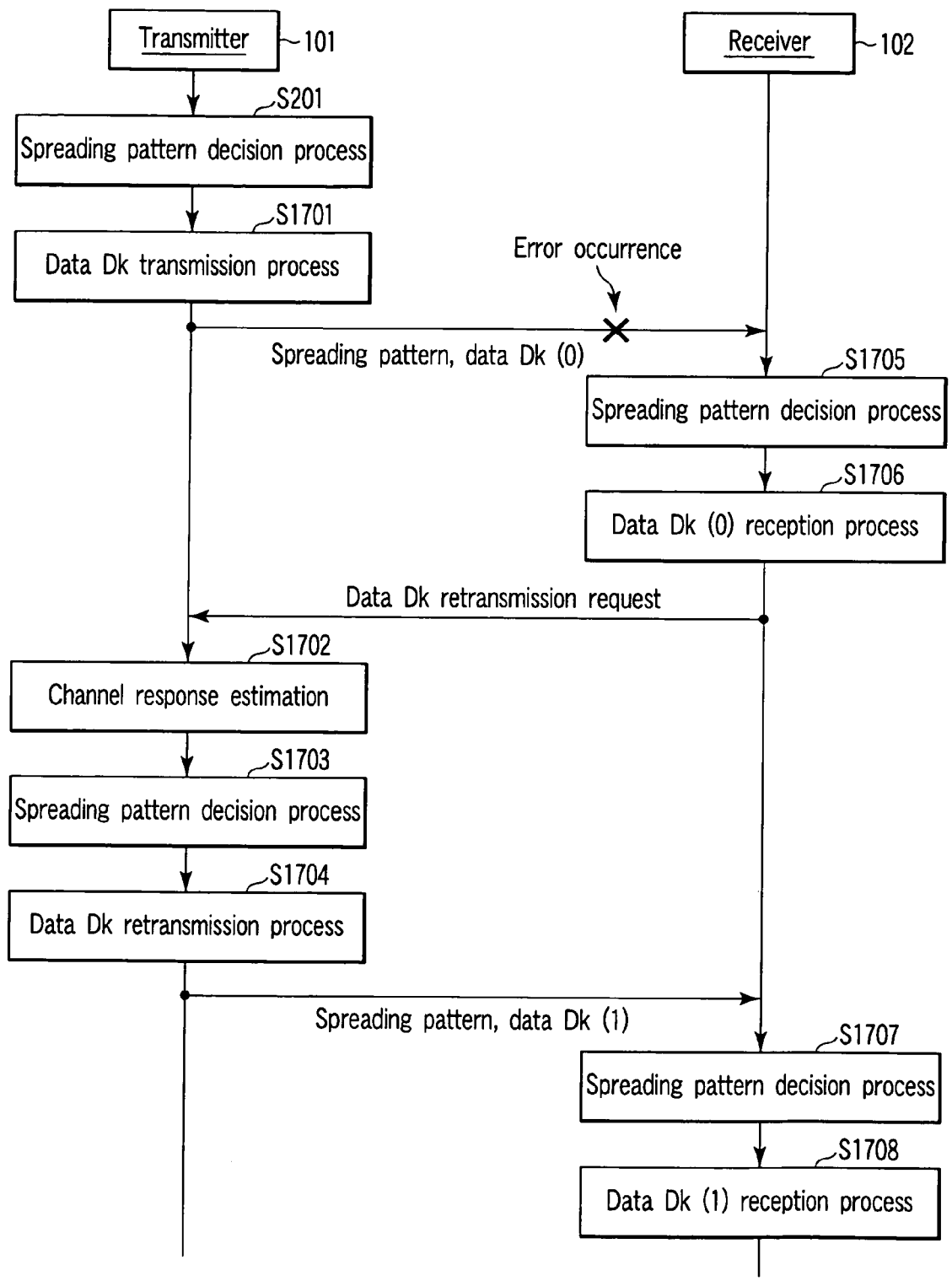
FIG. 17 is a flowchart showing an example of processes at a transmitter and a receiver regarding a fourth embodiment of the invention.

An example of a process of the transmitter 101 and the receiver 102 regarding the fourth embodiment will be described with reference to FIG. 17. In the embodiment, the transmitter 101 decides a spreading pattern, based on the estimation of a channel response to notify this spreading pattern to the receiver 102. The same steps described in the first embodiment with reference to FIG. 2 will be put the same reference marks as those of FIG. 2 and explanations thereof will be eliminated.

At first, the transmitter 101 conducts step S201. The transmitter 101 may select a spreading pattern low in error rate by using an error rate caused by the use of a previous spreading pattern and an error rate when the previous spreading pattern is in use, like the second embodiment.

Next, the transmitter 101 applies a transmission process to the data Dk by using the spreading pattern selected in step S201 (step S1701). In the transmission process, the transmitter 101 performs error correction encoding, spreading modulation, etc. The transmitter 101 also transmits the spreading pattern selected in step S201 by multiplexing it onto the data Dk. At this point, the information on the spreading pattern is spread by the known spreading rate and spreading code and transmitted. The multiplex method which is utilized in this transmission process includes the method of time multiplexing, frequency multiplexing and spreading code multiplexing and the like. The transmitter 101 transmits the data Dk and the spreading data information to which the transmission process is applied to the receiver 102, as the transmission data Dk (0).

At this point, it is assumed that an error occurs in data Dk (0) for some reason between the transmitter 101 and the receiver 102. The receiver 102 applies a spreading pattern decision process to the data with the error generated therein (step S1705). The receiver 102 decides a spreading pattern for transmission data Dk (0) by separating spreading information from received data to decode the spreading code information. Next, the receiver 102 applies a reception process to the transmission data Dk (0) by using the spreading pattern obtained in step S1705 (step S1706). At this time, when the receiver 102 cannot correct the error even by error correction decoding, the receiver 102 transmits a retransmission request for the data Dk to the transmitter 101.

When receiving the retransmission request for the data Dk, the transmitter 101 performs a channel response estimation process firstly (step S1702). The transmitter 101 estimates a time expansion and a temporal fluctuation in multi-path in the step S1702. The transmitter 101 decides a spreading pattern by using the time expansion and the temporal fluctuation in multi-path obtained from the transmission estimation process (step S1703). For example, when the time expansion exceeds thresholds, the transmitter 101 determines that the transmitter 101 is present in a channel response of which the frequency selectivity fading is hard and generates a spreading pattern larger in time spreading rate than that is used in the data Dk (0). These thresholds are decided in advance by means of a simulation or an experimental test, etc., in dependence on a transmission environment, performance of the radio communication system and the like.

Next, the transmitter 101 applies a transmission process to data Dk by using a spreading pattern decided in step S1703 (step S1704). The transmitter 101 applies a modulation process even to data on spreading pattern information like step S1702 to multiplex the spreading pattern information onto the data Dk. The transmitter 101 transmits the multiplexed data Dk (1) and the spreading pattern information to the receiver 102.

The receiver 102 decides a spreading pattern of the transmission data Dk (1) by separating the spreading code information from the received data to decode it (step S1707). The receiver 102 applies a reception process to the data Dk (1) by using a spreading pattern decided in step S1707 (step S1708).

Figure 18:
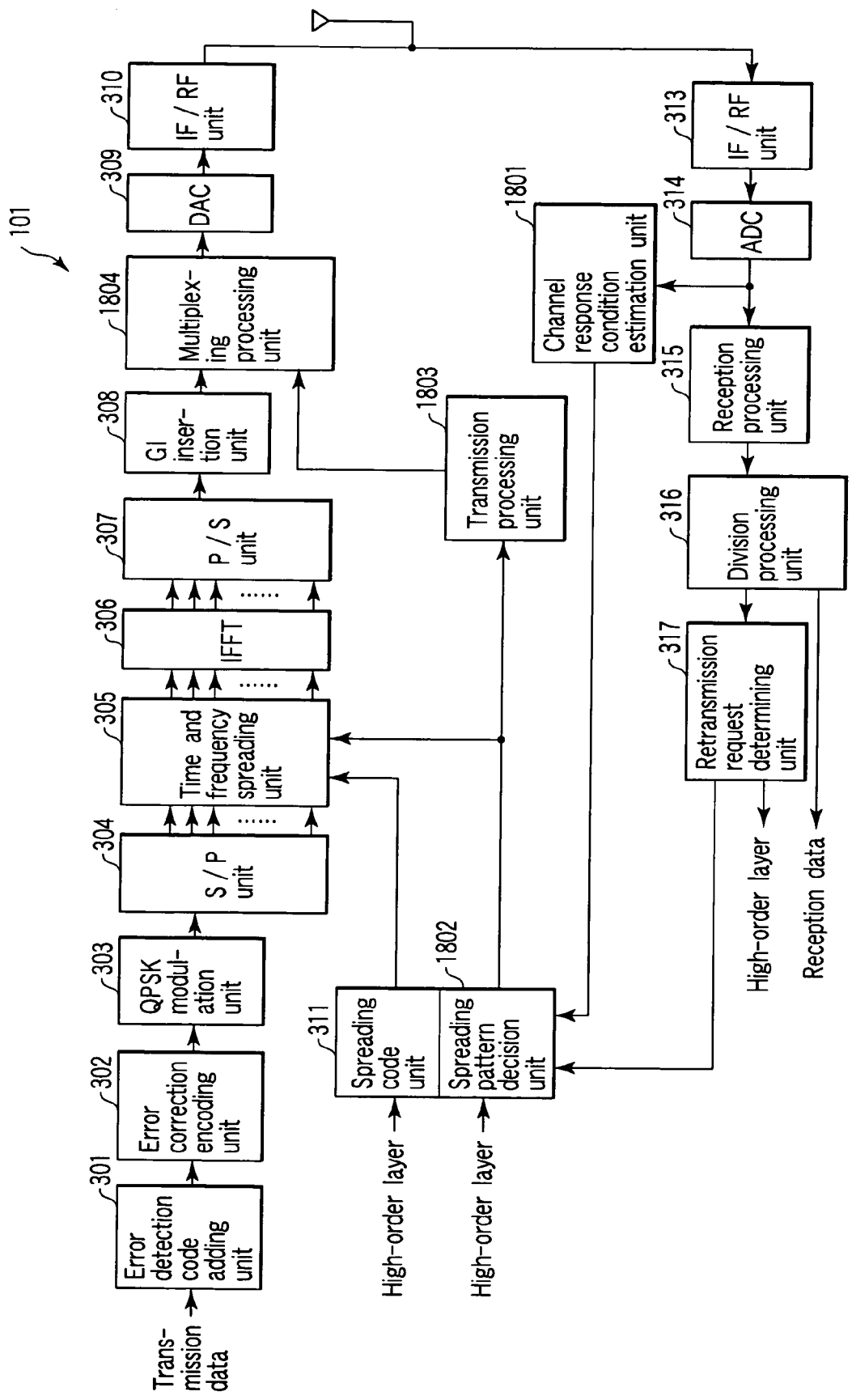
FIG. 18 is a block diagram of the transmitter regarding the fourth embodiment of the invention.

Next, the transmitter 101 regarding the embodiment will be described by referring to FIG. 18. The same units as those of the apparatus which has been described for the first embodiment by referring to FIG. 3 are given the same reference numbers and explanations therefor will be eliminated.

A transmission estimation unit 1801 estimates a state of multi-path, based on the received signal to output the estimated channel response state to a spreading pattern decision unit 1802.

The decision unit 1802 decides a spreading pattern, based on the information instructed from a high-order layer in the transmission of the data Dk (0). At this time, the high-order layer may instruct the spreading pattern itself and may instruct a previous error rate to each spreading pattern. The decision unit 1802 outputs the decided spreading pattern to the time and frequency spreading unit 305 and the spreading unit 305 uses this spreading pattern when performing spreading. The decision unit 1802 also outputs the decided spreading pattern to the time and frequency spreading unit 1803.

When it is determined that the retransmission request determining unit 317 is requested for the retransmission of the data Dk from the receiver 102, the decision unit 1802 decides a spreading pattern in response to the channel response state estimated by the estimation unit 1801. This spreading pattern is used for the spreading process of the data Dk (1).

The transmission processing unit 1803 applies a process of error correction encoding and modulation by using the spreading pattern decided by the decision unit 1802. A multiplex processing unit 1804 multiplexes by means of time multiplexing, frequency multiplexing, code multiplexing and the like.

Next to this, the receiver 102 regarding the embodiment will be mentioned by referring to FIG. 19. The same units as those of the apparatus described for the first embodiment with reference to FIG. 4 are given the same reference numbers and the explanations thereof will be skipped.

A division processing unit 1901 divides the received data into the data Dk and spreading pattern information. The division processing unit 1901 conducts a division process corresponding to a multiplex process which has been conducted at the multiplex processing unit 1804. The division processing unit 1901 outputs the data Dk to the GI elimination unit 403 and outputs the pattern information to a reception processing unit 1902.

The reception processing unit 1902 decodes the pattern information. The reception process at the reception processing unit 1902 corresponds to the transmission process at the transmission processing unit 1803. The reception processing unit 1902 outputs the decoding result from the reception processing unit 1902 to a spreading pattern decision unit 1903.

The pattern decision unit 1903 decides the spreading pattern, based on the decoding result. This decided spreading pattern is used at the time and frequency de-spreading unit 406.

A retransmission request processing unit 1904 receives the output from the error detection unit 410 to specify the slots with an error generated therein. The request processing unit 1904 decides the slot which needs to be retransmitted then outputs the retransmission request to the multiplex processing unit 414.

Figure 16:
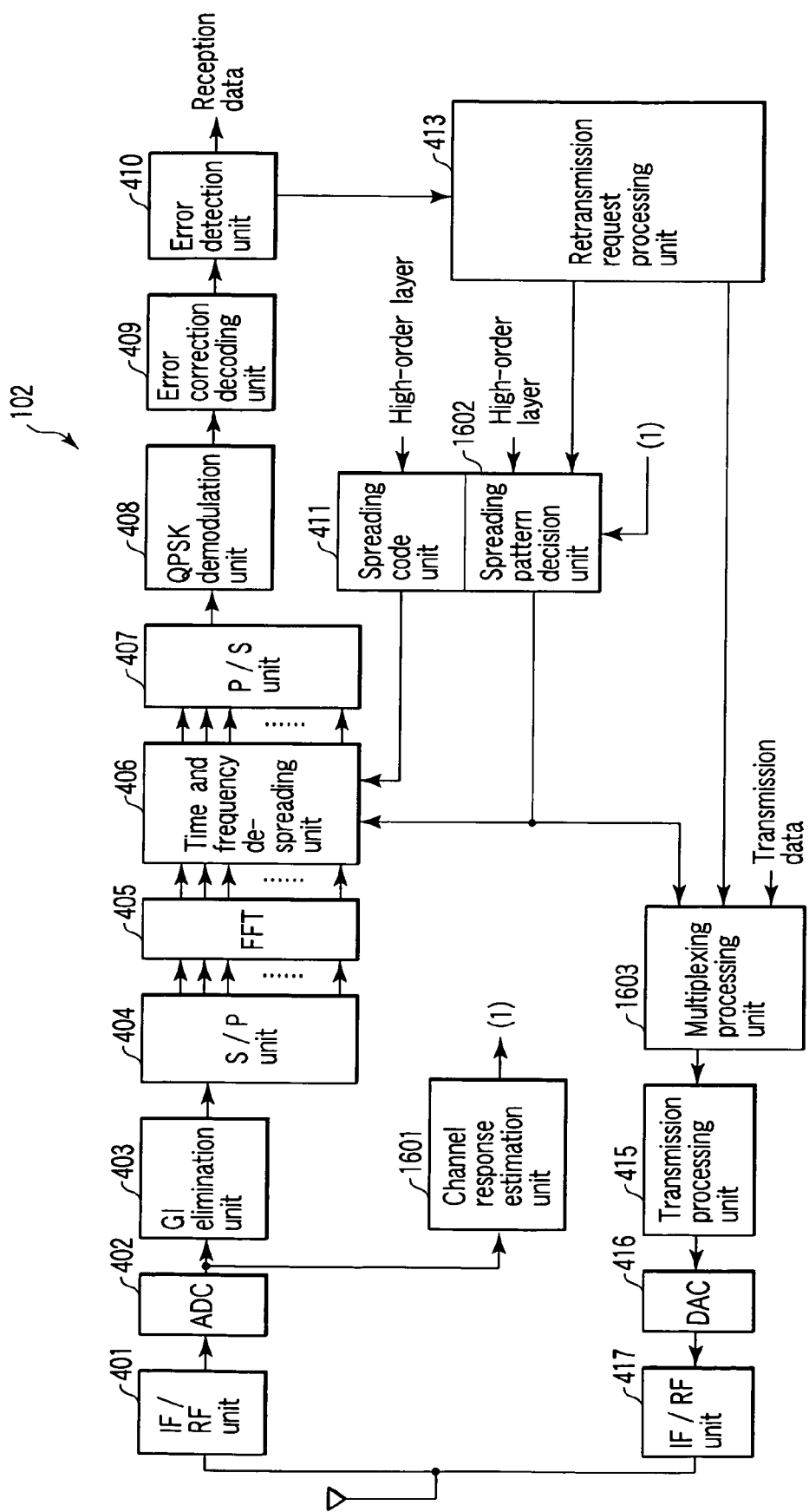
FIG. 16 is a block diagram of the receiver regarding the third embodiment of the invention.

As shown in FIG. 16, the receiver 102 may also have the channel response estimation unit 1601. In this case, the estimation unit 1601 multiplexes the information on channel response estimation onto the transmission data to transmit it to the transmitter 101. With estimation of channel responses by the side of the receiver 102, the receiver 102 can estimate channel responses even in a system in which the channel responses are different in transmitting and receiving, such as frequency division duplex (FDD) of which the channel responses are different with each other in upstream and downstream between the transmitter 101 and the receiver 102. As a result, the receiver 102 can select an optimum spreading rate, so that the number of times of the retransmissions can be decreased.

As stated above, according to the radio communication system regarding the fourth embodiment, when a channel response error is generated, the transmitter estimates the channel response to notify the optimum spreading pattern together with the data, so that the communication system can surely decrease the number of times of the retransmissions. Therefore, the radio communication system regarding this embodiment can restrict the overhead with respect to processes such as estimation of channel response and its feedback and the throughput to the minimum, decrease the number of times of retransmissions of the whole system and improve the system throughput.

FIFTH EMBODIMENT

Figure 20:
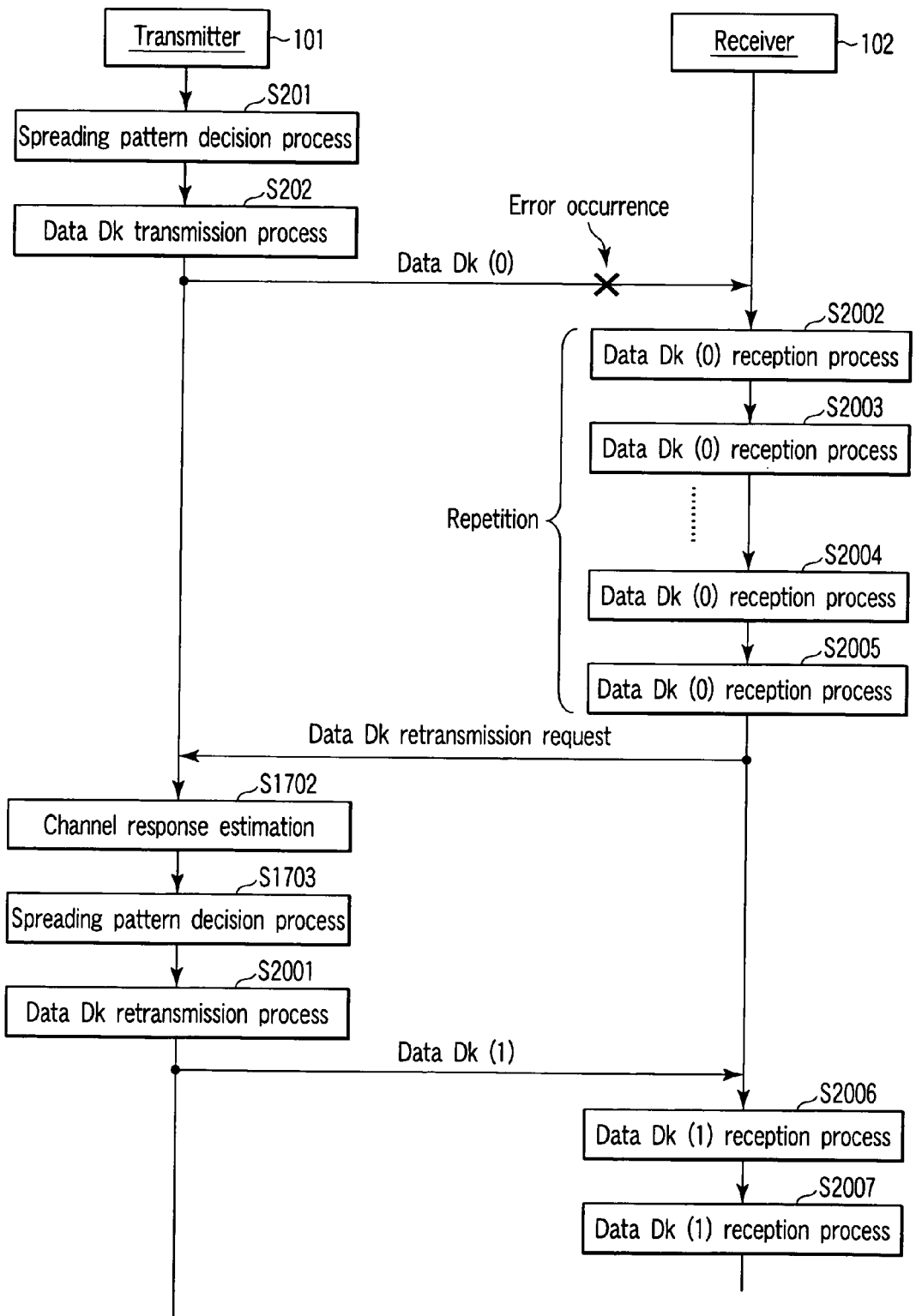
FIG. 20 is a flowchart showing an example of processes at a transmitter and a receiver regarding the fifth embodiment of the invention.

An example of processes at the transmitter 101 and the receiver 102 regarding the fifth embodiment will be described with reference to FIG. 20. In this embodiment, the transmitter 101 and the receiver 102 do not set the same spreading patterns in advance like the first embodiment and also do not decide the spreading patterns by using the same algorithms and the data like the second embodiment. The same steps which have been described in the first and the fourth embodiments by referring to FIG. 2 and FIG. 17, respectively, are given the same reference marks as those in FIG. 2 and FIG. 17 and explanations thereof will be eliminated.

At first, the transmitter 101 conducts step S201. The transmitter 101 may select a spreading pattern low in error rate by using the error rate in the use of a previous pattern and an error rate when the previous spreading pattern is used, like the second embodiment.

Next, the transmitter 101 conducts step S202. At this point, it is assumed that errors occur in the data Dk (0).by some cause between the transmitter 101 and the receiver 102. The receiver 102 applies a reception process to the data Dk (0) for the data with the errors generated therein (step S2002). On this occasion, one spreading pattern is selected to be decided among some spreading patterns notified from the high-order layer. In this case, the receiver 102 applies reception processes to another spreading pattern candidate if the errors cannot be corrected even by error correction decoding (from step S2003 to step S2005). The receiver 102 repeats this reception processes until the errors are corrected by the error correction decoding. When errors are detected in all reception processes although the reception processes have been applied by using spreading patterns of all pattern candidates, the receiver 102 transmits the retransmission request for the Data Dk to the transmitter 101.

When receiving the retransmission request for the data Dk, the transmitter 101 firstly applies a channel response estimation process (step S1702) to decide a spreading pattern, based on the result of the channel response estimation (step S1703)

Next, the transmitter 101 perform a transmission process for the data Dk by using the spreading pattern decided in step S1703 (step S2001). The receiver 102 conducts a reception process to the data Dk (1) by selecting one from some spreading pattern candidates notified from a high-order layer (step S2006). On this occasion, if errors cannot be corrected by the error correction decoding, the receiver 102 conducts the reception process to another spreading pattern candidate (step S2007). As the result of step S2007, if the errors have not detected, the receiver 102 decides the data received at this time to be the reception data and terminates the repetition of the reception process for the data Dk (1). If any error is detected in all reception processes even when the reception process have been performed by using the all spreading pattern candidates, the receiver 102 transmits the retransmission request for the data Dk to the transmitter 101.

Next to this, the transmitter 101 regarding the embodiment will be described by referring to FIG. 21. The same units as those of the apparatus described in the first and the fourth embodiment by referring to FIG. 3 and FIG. 18, respectively, are given the same reference numbers and explanations thereof will be eliminated.

A spreading pattern decision unit 2101 decides a spreading pattern, based on the information instructed from a high-order layer in the transmission of the data Dk (0). At this time, the layer may instruct the spreading pattern itself and may instruct previous error rates for individual spreading patterns. A spreading pattern decision unit 2101 outputs the decided spreading pattern to the time and frequency spreading unit 305 and the spreading unit 305 uses this spreading pattern in the spreading.

When determining that the retransmission request determining unit 317 is requested the retransmission of the Data Dk from the receiver 102, the pattern decision unit 2101 decides the spreading pattern in response to the channel responses estimated by the channel response estimation unit 1801. This spreading pattern is used for the spreading process applied to the data Dk (1).

Next, the receiver 102 regarding the embodiment will be described by referring to FIG. 22. The same units as the apparatus units, which are described in the first embodiment by referring to FIG. 4, are given the same reference numbers, and explanations thereof will be eliminated.

A buffer 2201 temporarily stores the received data Dk. The time and frequency de-spreading unit 406 applies a de-spreading process to the data stored in the buffer 2201 by using the spreading pattern specified by the pattern decision unit 2203.

A blind spreading pattern estimation processing unit 2202 inputs the detection result from the error detection unit 410 and if no error is detected in the data Dk, then, outputs it as reception data. If the detection unit 410 detects errors, the estimation processing unit 2202 outputs an instruction to the buffer 2201 and a spreading pattern decision unit 2203 so as to decode the reception data by using another spreading pattern candidate. As a result of decoding processes to all spreading pattern candidates, if the errors are generated in all spreading patterns, the receiver 102 instructs the retransmission request for the data Dk to the retransmission request processing unit 413. On this occasion, all spreading pattern candidates are the spreading patterns possible to be assumed to be decided by the spreading pattern decision unit 2101 of the transmitter 101.

The spreading pattern decision unit 2203 decides a spreading pattern for the packet which has been made a retransmission request from a high-order layer, based on the information which is input from the retransmission request processing unit 413 and related to a slot to be retransmitted and on the spreading pattern in which the error input from the estimation processing unit 2202 is detected.

As mentioned above, according to the radio communication system regarding the fifth embodiment, when a transmission error occurs, the transmitter estimates the channel response and applies a spreading process by using the optimum spreading pattern, so that the number of times of retransmission can be reduced. The receiver estimates the spreading pattern in blind, so that an amount of feedback information can be reduced. Accordingly, the communication system regarding this embodiment can restrain overhead with respect to throughput to decrease the number of times of retransmission of the whole system to the minimum and improve the system throughput.

The above-described embodiments are effective in the OFCDM radio communication system in which spreading processes are performed in a frequency direction and a time direction. Although frequencies of each carrier use quadrature frequencies in the embodiment, it is also effective in a multi-carrier CDMA communication system in which frequencies can be separated through a bandpass filter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system comprising: a radio transmitter comprising:
an adding unit which adds a parity bit for error detection to data;
a spreading unit configured to spread, in a time direction and a frequency direction, the data with the parity bit, based on a spreading pattern;
a transmission unit configured to transmit the spread data; and
a reception unit configured to receive a retransmission request signal,
wherein in response to the retransmission request signal, the spreading unit spreads to-be-retransmitted data with the parity bit, based on a varied spreading pattern which is varied according to at least one of the spreading rate in the time direction and the spreading rate in the frequency direction, and the transmission unit transmits the spread to-be-retransmitted data,
wherein the spreading unit varies the spreading rate in the time direction to be larger than spreading rate in the time direction in a last data transmission when retransmitting the data at the (2n+1)-th time (n is an integer equal to zero or more) and also the spreading rate in the frequency direction to be larger than spreading rate in the frequency direction in the last data transmission when retransmitting the data at the (2n+2)-th time, or varies the spreading rate in the frequency direction to be larger than spreading rate in the frequency direction in the last data transmission when retransmitting the data at the (2n+1)-th time and also the spreading rate in the frequency direction to be larger than spreading rate in the frequency direction in the last data transmission when retransmitting the data at the (2n+2)-th time,
wherein the spreading unit varies a spreading pattern to acquire products of (spreading rate in time direction)× (spreading rate in frequency direction) to be equal with each other in the last transmission and in a retransmission; and
a radio receiver comprising: a reception unit configured to receive the transmitted spread data;
a de-spreading unit configured to de-spread the received spread data, based on the spreading pattern;
an error detection unit configured to detect an error of the de-spread data, based on the parity bit; and
a transmission unit configured to transmit the retransmission request signal requesting a retransmission of the data if the error is detected in the de-spread data,
wherein the reception unit receives retransmitted data, and the de-spreading unit de-spreads the retransmitted data, based on the varied spreading pattern.

2. The radio communication system according to claim 1, wherein the spreading unit varies the spreading pattern to establish a relation:

α×(spreading rate in time direction)<β×(spreading rate in frequency direction) (α and β are real numbers)

in the case of spreading of the retransmission data, if a relation:

α×(spreading rate in time direction)>β×(spreading rate in frequency direction) is established in a last transmission.

3. The radio communication system according to claim 2, wherein in the spreading unit, α and β are both 1.

4. The radio communication system according to claim 2, wherein in the spreading unit, α and β are both −1.

5. The radio communication system according to claim 1, wherein the radio transmitter and the radio receiver further comprises a storage unit configured to store an error rate and a plurality of spreading rates with associating the error rate with the spreading rates in the time and frequency directions if the data is spread, the error rate indicating a frequency of occurrences of errors in the data between the radio transmitter and the radio receiver, and the spreading unit and the de-spreading unit use spreading patterns lowest in error rate by referring to the storage unit and use spreading patterns sequentially high in error rate in turn as the data is retransmitted.

6. A radio communication system comprising:
a radio transmitter comprising:
an adding unit which adds a parity bit for error detection to data;
a spreading unit which spreads, in a time direction and a frequency direction, the data with the parity bit, based on a spreading pattern;
a transmission unit which transmits the spread data; and
a reception unit which receives a retransmission request signal,
wherein in response to the retransmission request signal, the spreading unit spreads to-be-retransmitted data with the parity bit, based on a varied spreading pattern which is varied according to at least one of the spreading rate in the time direction and the spreading rate in the frequency direction, and the transmission unit transmits the spread to-be-retransmitted data; and
a radio receiver comprising:
a reception unit which receives the transmitted spread data;
a de-spreading unit which de-spreads the received spread data, based on the spreading pattern;
an error detection unit which detects an error of the de-spread data, based on the parity bit;
a transmission unit which transmits the retransmission request signal requesting a retransmission of the data if the error is detected in the de-spread data; and
an estimation which estimates a channel response, based on the received signal;
and a varying unit which varies the spreading pattern, based on the channel response, the transmission unit included in the radio receiver including spreading pattern information with the spreading pattern into the retransmission request signal to transmit the pattern information to the radio transmitter, wherein the reception unit receives retransmitted data, and the de-spreading unit de-spreads the retransmitted data, based on the varied spreading pattern, and wherein the radio receiver further comprises an estimation which estimates a channel response, based on the received signal; and a varying unit configured to vary the spreading pattern, based on the channel response, the transmission unit included in the radio receiver including spreading pattern information with the spreading pattern into the retransmission request signal to transmit the pattern information to the radio transmitter.

7. The radio communication system according to claim 6, wherein the transmission unit included in the radio receiver transmits the spreading pattern information and the retransmission request signal by a spreading pattern decided in advance with the radio transmitter.

8. The radio communication system according to claim 7, wherein the transmission unit included in the radio receiver transmits the data, the spreading pattern information and the retransmission request signal by multiplexing in one of time multiplexing, frequency multiplexing and code multiplexing.

9. The radio communication system according to claim 1, wherein the transmission unit included in the radio receiver transmits the retransmission request signal by the spreading pattern decided in advance with the radio transmitter.

10. The radio communication system according to claim 1, wherein the de-spreading unit sequentially selects one spreading pattern from a plurality of spreading patterns to be used by the spreading unit to de-spread the received data, based on the selected spreading pattern.

11. The radio communication system according to claim 1, wherein the transmission unit included in the radio receiver transmits the data and the retransmission request signal by multiplexing in one of time multiplexing, frequency multiplexing and code multiplexing.

12. A radio transmitter comprising:
an adding unit which adds a parity bit for error detection to data;
a spreading unit configured to spread, in a time direction and a frequency direction, the data with the parity bit, based on a spreading pattern;
a transmission unit configured to transmit the spread data; and
a receiving unit configured to receive, from a radio receiver, a retransmission request signal requesting for a retransmission of the spread data if an error is detected in the spread data,
wherein the spreading unit, in response to the retransmission request signal, spread retransmission data with the parity bit, based on the spread pattern which is varied according to at least one of a spreading rate in the time direction and a spreading rate in the frequency direction, and the transmission unit transmits the retransmission data,
wherein the spreading unit varies the spreading rate in the time direction to be larger than spreading rate in the time direction in a last data transmission when retransmitting the data at the (2n+1)-th time (n is an integer equal to zero or more) and also the spreading rate in the frequency direction to be larger than spreading rate in the frequency direction in the last data transmission when retransmitting the data at the (2n+2)-th time, or varies the spreading rate in the frequency direction to be larger than spreading rate in the frequency direction in the last data transmission when retransmitting the data at the (2n+1)-th time and also the spreading rate in the frequency direction to be larger than spreading rate in the frequency direction in the last data transmission when retransmitting the data at the (2n+2)-th time, and
wherein the spreading unit varies a spreading pattern to acquire products of (spreading rate in time direction)×(spreading rate in frequency direction) to be equal with each other in the last transmission and in a retransmission.

* * * * *

UNITED STATES PATENT AND TRADEMARK OFFICE
CERTIFICATE OF CORRECTION

PATENT NO. : 7,522,668 B2  Page 1 of 1
APPLICATION NO. : 11/372199
DATED : April 21, 2009
INVENTOR(S) : Horiguchi It is certified that error appears in the above-identified patent and that said Letters Patent is hereby corrected as shown below:

Claim 6, column 19, line 30, change "freguency" to --frequency--.

Claim 6, column 19, line 39, change "freguency" to --frequency--.

Claim 6, column 19, line 48, change "reguesting" to --requesting--.

Signed and Sealed this

Second Day of June, 2009

JOHN DOLL
*Acting Director of the United States Patent and Trademark Office*